United States Patent [19]
Yamamoto

[11] Patent Number: 6,061,150
[45] Date of Patent: *May 9, 2000

[54] IMAGE PROCESSING METHOD AND APPARATUS

[75] Inventor: Masahito Yamamoto, Yokohama, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/959,287

[22] Filed: Oct. 24, 1997

Related U.S. Application Data

[63] Continuation of application No. 08/425,154, Apr. 19, 1995, abandoned.

[30] Foreign Application Priority Data

Apr. 20, 1994 [JP] Japan .................................... 6-081247

[51] Int. Cl.$^7$ ........................................................ H04N 1/40
[52] U.S. Cl. ............................ 358/444; 358/468; 358/434
[58] Field of Search ..................................... 358/444, 448, 358/403, 468, 434, 437, 400, 407, 443

[56] References Cited

U.S. PATENT DOCUMENTS

| | | | |
|---|---|---|---|
| 4,878,123 | 10/1989 | Miura et al. | 358/444 |
| 5,537,218 | 7/1996 | Negi | 358/444 |
| 5,790,267 | 8/1998 | Shibata et al. | 358/437 |

*Primary Examiner*—Thomas D. Lee
*Attorney, Agent, or Firm*—Fitzpatrick, Cella, Harper & Scinto

[57] ABSTRACT

An image processing system includes an input device for inputting image data, a processing device for performing an image processing job on image data input from the input device, an output device for outputting image data processed by the processing device, and a holding device for holding image data processed by the processing device when the image processing job performed by the processing device satisfies predetermined conditions.

12 Claims, 19 Drawing Sheets

IMAGE PROCESSING METHOD AND APPARATUS

This application is a continuation of application Ser. No. 08/425,154 filed Apr. 19, 1995.

BACKGROUND OF THE INVENTION

1. Field of the Invention

The present invention relates to an image processing method and apparatus for performing image processing, such as transmission, storage, or recording of images.

2. Description of the Related Art

In recent years, a multi-function type combined image processing apparatus has been commercially available, which apparatus has the following various functions added to an image forming apparatus (such as a copying machine), as peripheral devices: a printer function for printing image information input from a computer or the like, a scanner function for reading an original document on a document holder and outputting the read data to a computer or the like, a facsimile function for transmitting and receiving an image to and from a terminal connected to a public telecommunications line, a rasterizing function for interpreting page description language and developing it into bit map data, and an image file function for storing and reading out image data from a secondary storage device having a large capacity, and which apparatus is capable of utilizing each function of the input system, each function of the conversion system and each function of the output system in combination.

Also, some color copying machines are designed to be easily usable as a printer or a scanner by connecting as a peripheral device an intelligent processing unit (IPU) which serves as an interface for various analog/digital video images.

Some of these combined image processing apparatuses or systems are capable of selecting a desired function from a plurality of functions of the image output system and outputting the function by controlling the controller when it has a plurality of image output functions.

However, in a conventional combined image processing apparatus, as an image output apparatus involved in one image processing job, just one apparatus is selected and used from among a plurality of image output apparatuses. That is, to output one image to a plurality of image output apparatuses having different functions, a separate image output job corresponding to each of the plurality of image output apparatuses is executed individually. Therefore, when it is desired to produce duplicate copies of the result of the image processing in execution, the operator must perform the image processing job twice, once for each copy. For example, after a facsimile transmission to an important destination, to make a duplicate copy of the transmitted image, additional operation, for example, copying the original image onto paper or storing it in an image file, must be performed, in response to a new operation instruction. Not only is the manual operation for making a duplicate copy inconvenient for the operator, but also there is the risk that the operator may forget to make the duplicate copy.

SUMMARY OF THE INVENTION

The present invention has been achieved to solve the above-described problems of the prior art. It is an object of the present invention to provide an image processing method and apparatus capable of surely making any necessary duplicate copy of an image without requiring so many manual operations by the operator.

It is another object of the present invention to provide an image processing method and apparatus capable of holding necessary image data from image data output in an image file or the like during facsimile transmission, printout and the like.

According to one aspect of the present invention, there is provided an image processing method, comprising the steps of: a processing step for performing an image processing job on image data; a determining step for determining if an image processing job performed in the processing step satisfies predetermined conditions; and an output step for outputting the image data obtained by performing the image processing job in the processing step to an output destination which is not related to the image processing job, when it is determined in the determination step that the image processing job satisfies the predetermined conditions.

According to another aspect of the present invention, there is provided an image processing apparatus, comprising: processing means for performing an image processing job on image data; determining means for determining if the image processing job performed by the processing means satisfies predetermined conditions; and output means for outputting the image data obtained by performing the image processing job to an output destination which is not related to the image processing job, when it is determined by the determination means that the image processing job satisfies the predetermined conditions.

The above and further objects, aspects and novel features of the invention will more fully appear from the following detailed description when read in connection with the accompanying drawings.

DESCRIPTION OF THE PREFERRED EMBODIMENTS

Figure 1:
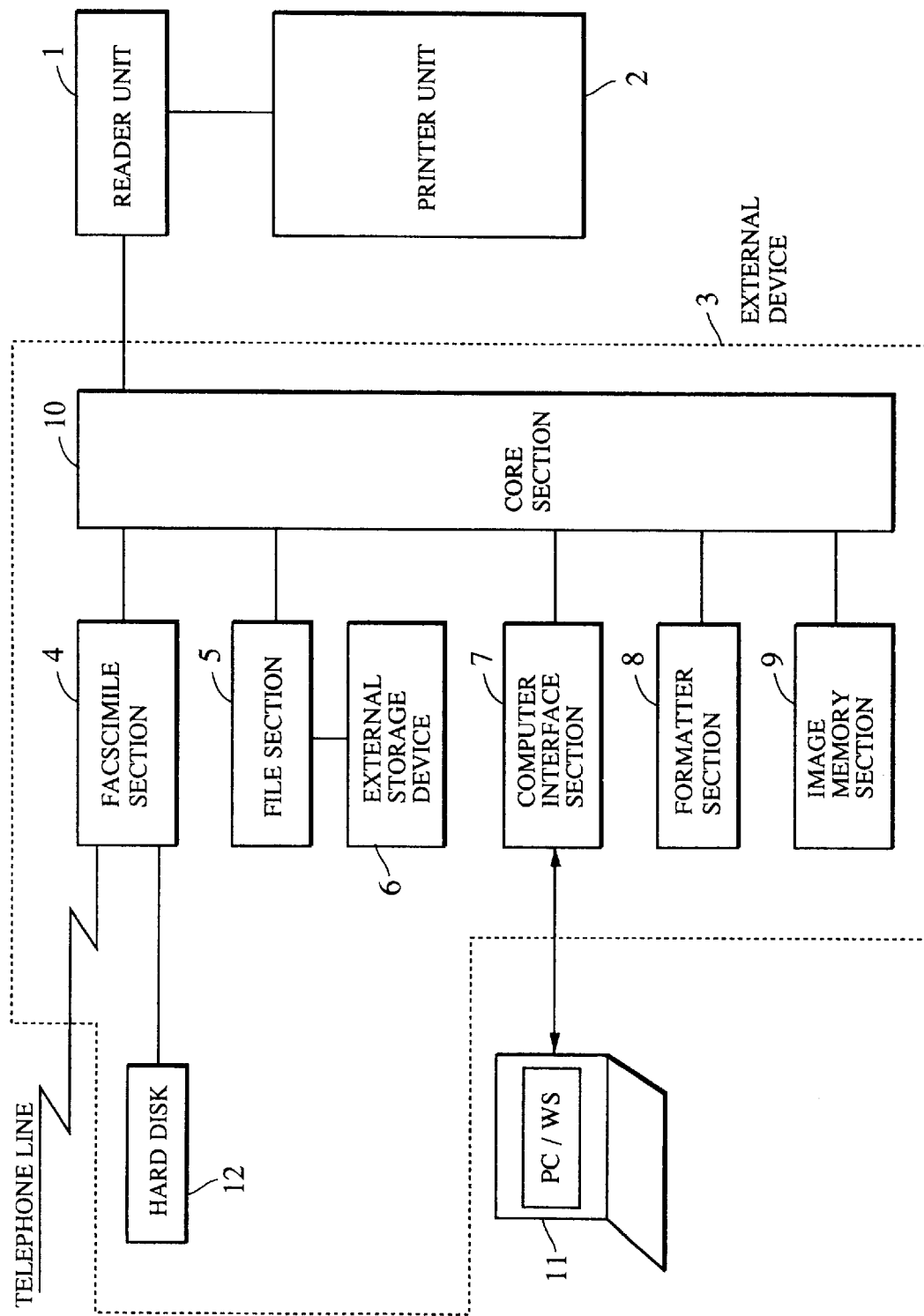
FIG. 1 is a general view of an image processing apparatus in accordance with one embodiment of the present invention.

FIG. 1 illustrates the construction of a combined image processing apparatus to which the present invention is applied. The basic operation of the combined image processing apparatus will be explained first with reference to FIG. 1.

Reference numeral 1 denotes an image input apparatus (hereinafter referred to as a reader unit) in which imaging elements, such as CCDs, read an original document to produce corresponding image data; reference numeral 2 denotes an image output apparatus, such as a laser beam printer or an ink jet printer (hereinafter referred to as a printer unit), having a plurality of types of recording paper cassettes, for outputting image data as visible images onto recording paper in accordance with a print command; and reference numeral 3 denotes an external device which is electrically connected to the reader unit 1 and which has various types of functions.

The external device 3 consists of a facsimile section 4, a file section 5, an external storage device 6 connected to the file section 5, a computer interface section 7 for connecting to a computer (PC/WS) 11, a formatter section 8 for making information from the computer 11 visible, an image memory section 9 for temporarily storing information received from the computer 11, and a core section 10 for controlling the above functions.

The function of each section will be explained below in detail.

[Explanation of the Reader Unit 1]

Figure 2:
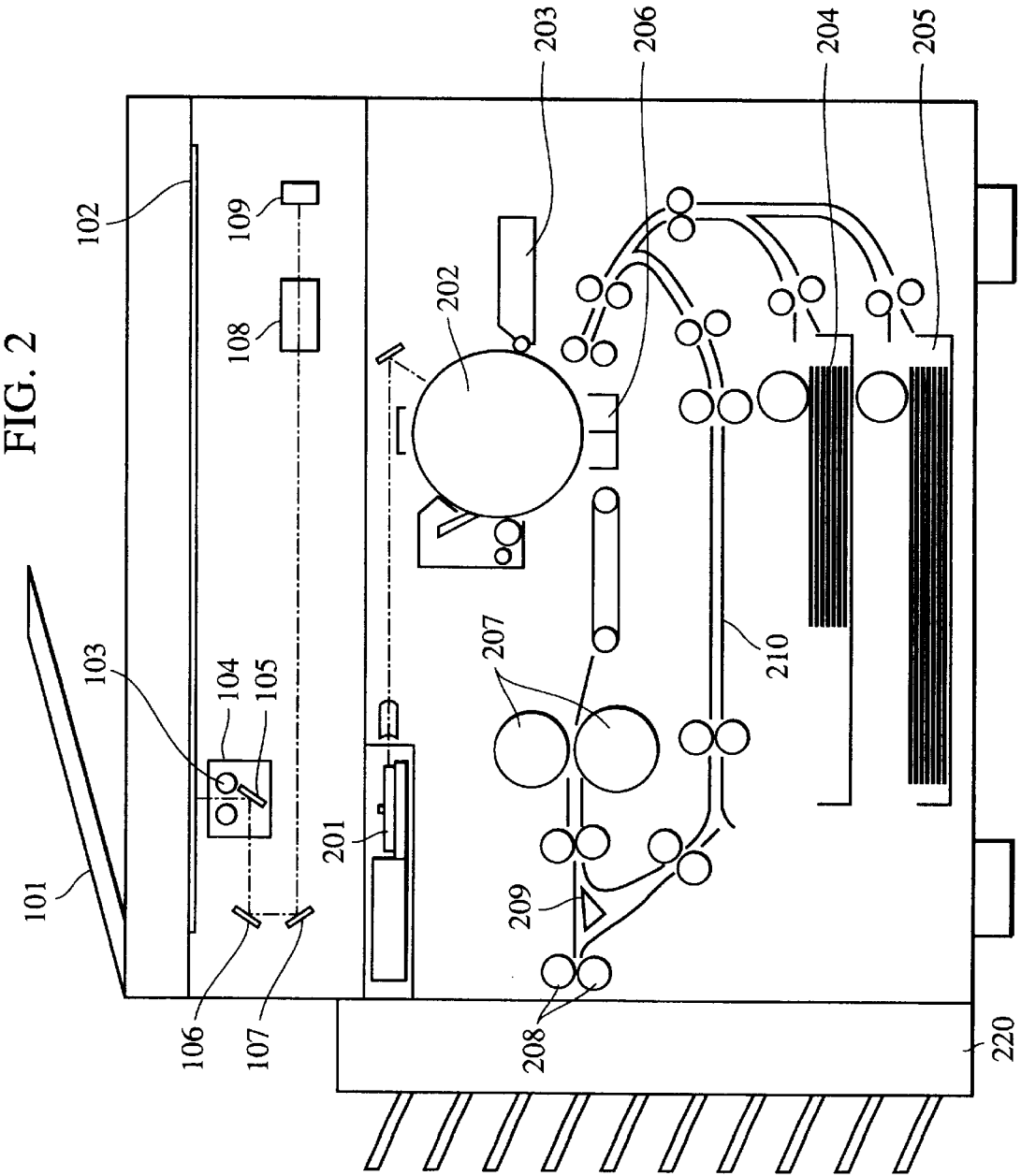
FIG. 2 is a block diagram of a reader unit and a printer unit in accordance with the first embodiment of the present invention.
Figure 3:
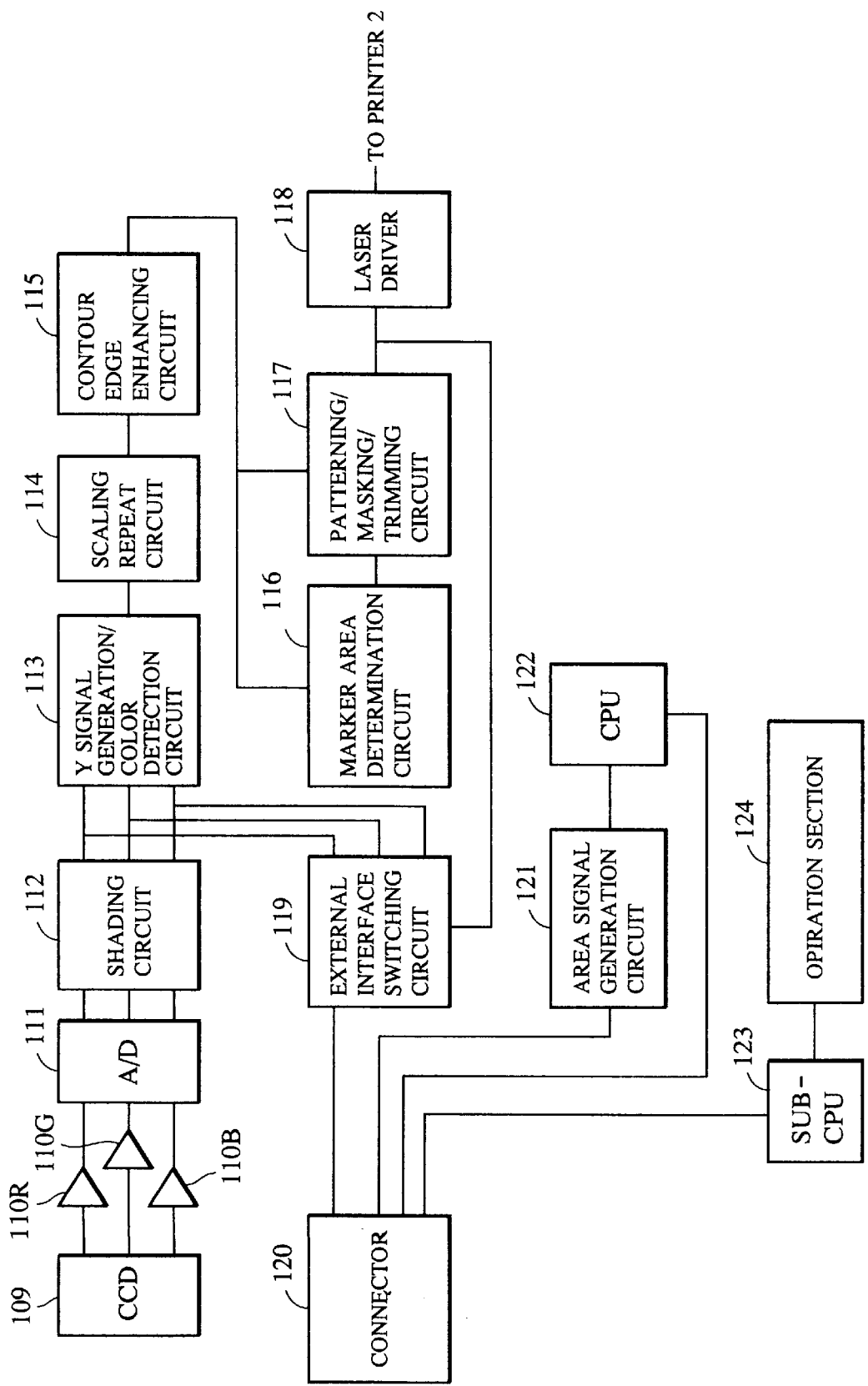
FIG. 3 is a block diagram of an image processing section of the reader unit in accordance with the first embodiment of the present invention.

A detailed explanation of the reader unit 1 will be provided with reference to FIGS. 2 and 3.

Original documents stacked on a document transport apparatus 101 are fed onto a document holder glass 102. When the document is transported, a lamp 103 of the scanner unit is lit, and the scanner unit 104 moves to expose and scan the document. The light reflected from the document passes through a lens 108 via mirrors 105, 106 and 107, and then enters a CCD image sensor unit 109 (hereinafter referred to as a CCD).

The image processing of the reader unit 1 will now be explained in detail with reference to FIG. 3. Image information input to the CCD 109 as light is color separated and photoelectrically converted into electrical signals by the CCD 109. The color information for each of three color components from the CCD 109 is amplified by a respective amplifier 110R, 110G, or 110B according to the input signal level of an A/D converter 111, after which the information is converted into digital image signals for each color component of the three colors by the A/D converter 111. The signals output from the A/D converter 111 are input to a shading circuit 112 whereby shading distortion, such as distributed light variation of the lamp 103 or sensitivity variation of the CCD 109, is corrected. The RGB digital image signals from the shading circuit 112 are input to a Y signal generation/color detection circuit 113 and an external interface switching circuit 119.

The Y signal generation/color detection circuit 113 computes the RGB digital image signals by an equation described below and obtains the Y signal:

$$Y = 0.3R + 0.6G + 0.1B$$

Further, the Y signal generation/color detection circuit 113 has a color detection circuit for separating the RGB digital image signals into seven colors and outputting signals for each color.

The signals output from the Y signal generation/color detection circuit 113 are input to a scaling/repeat circuit 114. In the reader unit 1, scaling along the subscanning direction is performed by varying the scanning speed of the scanner unit 104 according to the scaling factor, and scaling along the main scanning direction is performed by decreasing or increasing image signals by means of the scaling/repeat circuit 114 according to the scaling factor. It is also possible to have the scaling/repeat circuit 114 output the same image repeatedly.

A contour/edge enhancement circuit 115 obtains edge enhanced image signals and contour information by enhancing high-frequency components of the signals from the scaling/repeat circuit 114. The signals from the contour/edge enhancement circuit 115 are input to a marker area determination circuit 116 and a patterning/masking/trimming circuit 117.

The marker area determination circuit 116 reads a portion written with a marker pen of a specified color on the original document and generates contour information which represents the contour marked with the marker. The patterning/masking/trimming circuit 117 performs masking or trimming on the basis of the contour information, and also performs patterning on the basis of the color detection signals from the Y signal generation/color detection circuit 113.

The signals output from the patterning/masking/trimming circuit 117 are input to a laser driver circuit 118, where various operations are performed on the signals and the signals are converted into signals for driving the laser. The drive signals from the laser driver circuit 118 are input to the printer unit 2, where the signals are formed into a visible image.

Next, an explanation will be given of an external interface switching circuit 119 for interfacing with the external device 3. When image information (8-bit multi-valued digital image signals) from the reader unit 1 are output to the external device 3, the external interface switching circuit 119 outputs image information from the patterning/masking/trimming circuit 117 to a connector 120. When the reader unit 1 inputs image information from the external device 3, the external interface switching circuit 119 inputs the image information from the connector 120 to the Y signal generation/color detection circuit 113.

Each of the above-described image processing is performed in accordance with an instruction from a CPU 122 in response to the operation command from an operation section 124. An area creation circuit 121 generates various timing signals necessary for the above-described image processing on the basis of the values set by the CPU 122. Further, by using communication functions installed in the CPU 122, communication with the external device 3 is performed via the connector 120. A sub-CPU 123 controls the operation section 124 and communicates with the external device 3 via the connector 120 by using the communication functions installed in the sub-CPU 123.

[Explanation of the Printer Unit 2]

In FIG. 2, the image signals input to the printer unit 2 are converted into optical signals (a laser beam) by an exposure control section 201, causing a photosensitive member 202 to be irradiated in accordance with the image signals. The latent image formed on the photosensitive member 202 is developed by a developing unit 203. In synchronization with the development, transfer paper is transported from a transfer paper stacking section 204 or 205, and the developed image is transferred by a transfer section 206. The image-transferred transfer paper is fixed by a fixing section 207, after which the paper is ejected from the apparatus by a paper ejection section 208. The transfer paper output from the paper ejection section 208 is ejected in alignment with one or another bin of sorter 220 when the sort function of the sorter 220 is operating, and when the sort function is not operating, the transfer paper is ejected to the topmost bin of the sorter.

Next, an explanation will be given of a method in which images for two sheets or pages of paper will be recorded on both sides of one sheet of output paper, on the basis of image signals for two original documents which are read in sequence.

The output paper fixed by the fixing section 207 is transported to the paper ejection section 208 once, after which the orientation of the paper is reversed and it is transported to a transferred paper stacking section 210 for resupply via a transportation direction switching member 209. When the next original document becomes ready, in the same way as in the above process, the image of the original document is read. Since the transfer paper is fed by the transferred paper stacking section 210 for paper resupply, it is possible to output two original documents onto the obverse and reverse sides of one sheet of output paper.

[Explanation of the External Device 3]

The external device 3 is connected to the reader unit 1 through a cable, and signals and various functions are controlled by the core section 10 inside the external device 3. The external device 3 consists of the facsimile section 4 for transmitting and receiving a facsimile, the file section 5 for converting various original document information into electrical signals and storing the signals, the computer interface section 7 for interfacing with the computer 11, the formatter section 8 for developing code information from the computer 11 into image information, the image memory section 9 for storing information from the reader unit 1 and for temporarily storing information received from the computer 11, and the core section 10 for controlling the above-described various functions.

The functions of each section will be explained below in detail.

[Explanation of the Core Section 10]

The core section 10 will now be explained with reference to FIG. 4. A connector 1001 of the core section 10 is connected to the connector 120 of the reader unit 1 through a cable (not shown).

Four types of signals are connected to the connector 1001. A signal on line 1057 is an 8-bit multi-valued digital image signal. A signal on line 1055 is a control signal for controlling digital image signals. A signal on line 1051 is used to communicate with the CPU 122 in the reader unit 1. A signal on line 1052 is used to communicates with the sub-CPU 123 in the reader unit 1. The lines 1051 and 1052 are connected to a communication IC 1002 whereby communication information processed by a communication protocol process is transmitted to a CPU 1003 via a CPU bus 1053.

The signal line 1057 is a bi-directional video signal line, and thus information from the reader unit 1 can be received by the core section 10 and information from the core section 10 can be output to the reader unit 1. The signal on line 1057 is stored in a buffer 1010 where the bi-directional signal is separated into uni-directional signals, supplied via lines 1058 and 1070. The uni-directional signal on line 1058 is an 8-bit multi-valued digital image signal which is output from the reader unit 1 and then input to an LUT (look-up table) 1011 at the next stage. Digital image signals from the reader unit 1 are converted into desired values by referring to the LUT 1011. A signal on a line 1059 from the LUT 1011 is input to a binarization circuit 1012 or a selector 1013. The binarization circuit 1012 has a simple binarization function for binarizing the multi-valued digital image signal 1059 (hereinafter, the signals will sometimes be referred to by the numbers of the lines which carry them, where no confusion will result) on the basis of a fixed slice level, a binarization function based on a variable slice level such that the slice level varies from the value of the pixels around the subject pixel, and a binarization function based on an error diffusion method.

Binarized information is converted into multi-valued signals of 00H when the information is "0" and FFH when the information is "1" and then input to the selector 1013 at the next stage. The selector 1013 selects either the signal from the LUT 1011 or the signal output from the binarization circuit 1012. A signal 1060 output from the selector 1013 is input to a selector 1014. The selector 1014 selects either digital image signal 1064 input to the core section 10, which is input from the facsimile section 4, the file section 5, the computer interface section 7, the formatter section 8, and the image memory section 9 via connectors 1005, 1006, 1007, 1008 and 1009, respectively, or the signal 1060 output from the selector 1013, in accordance with an instruction from the CPU 1003.

A signal 1061 output from the selector 1014 is input to a rotation circuit 1015 or a selector 1016. The rotation circuit 1015 has a function for rotating the input image signal by +90°, −90°, or +180° and stores binarization image signals to be subjected to rotation.

Next, the rotation circuit 1015 performs a rotation operation on binarization image signals stored and reads signals in accordance with an instruction from the CPU 1003. The selector 1016 selects either a signal 1062 output from the rotation circuit 1015 or a signal 1061 input to the rotation circuit 1015, and inputs the selected signal on line 1063, to a connector 1005 for the facsimile section 4, a connector 1006 for the file section 5, a connector 1007 for the computer interface section 7, a connector 1008 for the formatter section 8, a connector 1009 for the image memory section 9, and a selector 1017.

The signal line 1063 is an 8-bit synchronous unidirectional video bus through which image information is transferred from the core section 10 to the facsimile section 4, the file section 5, the computer interface section 7, the formatter section 8 and the image memory section 9. The digital image signal line 1064 is an 8-bit synchronous uni-directional video bus through which image information is transferred from the facsimile section 4, the file section 5, the computer interface section 7, the formatter section 8 and the image memory section 9. A video control circuit 1004 controls the synchronous bus between the signals 1063 and 1064, and control is performed by a signal 1056 output from the video control circuit 1004.

Further, a signal line 1054 is connected to the connectors 1005, 1006, 1007, 1008 and 1009. The signal 1054 is a bi-directional 16-bit CPU bus through which data and commands are exchanged by an asynchronous method. Transferring of information from the facsimile section 4, the file section 5, the computer interface section 7, the formatter section 8 and the image memory section 9 to the core section 10 or vice versa is possible through the video buses 1063 and 1064 and the CPU bus 1054.

The signals 1064 from the facsimile section 4, the file section 5, the computer interface section 7, the formatter section 8 and the image memory section 9 are input to the selector 1014 and the selector 1017. The selector 1014 inputs the signals 1064 to the rotation circuit 1015 at the next stage in accordance with an instruction from the CPU 1003.

The selector 1017 selects the signals 1063 and 1064 in accordance with an instruction from the CPU 1003. A signal 1065 output from the selector 1017 is input to a pattern matching circuit 1018, and selectors 1019 and 1021. The pattern matching circuit 1018 performs pattern matching between the signal 1065 and a predetermined pattern. When the patterns match each other, a predetermined multi-valued signal is output to a signal line 1066. When the patterns do not match, the input signal 1065 is output as it is to the signal line 1066.

The selector 1019 selects either the signal 1065 or the signal 1066 in accordance with an instruction from the CPU 1003. A signal 1067 output from the selector 1019 is input to an LUT 1020 at the next stage, whereby the input signal 1067 is converted in conformity with the characteristics of printer unit 2 when image information is output to the printer unit 2.

A selector 1021 selects either a signal 1068 or 1065 output from the LUT 1020 in accordance with an instruction from the CPU 1003. The signal output from the selector 1021 is input to an enlarging circuit 1022 at the next stage.

The enlarging circuit 1022 is capable of enlarging the image in accordance with scaling-up factors set independently of each other along the X and Y directions in accordance with an instruction from the CPU 1003. The scaling-up method is a first-order linear interpolation method. A signal 1070 output from the enlarging circuit 1022 is input to the buffer 1010. The signal 1070 input to the core section 10 is formed into a bi-directional signal 1057 in accordance with an instruction from the CPU 1003, sent out to the printer unit 2 via the connector 1001 and printed out.

Next, the flow of signals between the core section 10 and each section will be explained.

[The Operation of the Core Section 10 on the Basis of the Information from Facsimile Section 4]

A case in which image information is output to the facsimile section 4 will be explained. The CPU 1003 communicates with the CPU 122 of the reader unit 1 via the communication IC 1002 and issues an original document scan command. The reader unit 1 outputs image information to the connector 120 when the scanner unit 104 scans the original document in response to this command. The reader unit 1 and the external device 3 are connected to each other through a cable. The image information from the reader unit 1 is input to the connector 1001 of the core section 10, and the image information input to the connector 1001 is input to the buffer 1010 through the multi-valued 8-bit signal line 1057. The buffer 1010 inputs the bi-directional signal 1057 as a uni-directional signal to the LUT 1011 via the signal line 1058 in accordance with an instruction from the CPU 1003. The LUT 1011 converts image information from the reader unit 1 into desired values by using a look-up table (this permits, for example, an all-white portion like the base of the original document to be skipped. The signal 1059 output from the LUT 1011 is input to the binarization circuit 1012 at the next stage, which converts the 8-bit multi-valued signal 1059 to a binary signal. When the binarized signal is "0" or "1", the binarization circuit 1012 converts the signal into two multi-valued signals of levels 00H and FFh, respectively.

The signal output from the binarization circuit 1012 is input to the rotation circuit 1015 or the selector 1016 via the selector 1013 and the selector 1014, respectively. The signal 1062 output from the rotation circuit 1015 is also input to the selector 1016 where either the signal 1061 or the signal 1062 is selected. This selection of the signal is determined by the CPU 1003 making communications with the facsimile section 4 via the CPU bus 1054. The signal 1063 output from the selector 1016 is sent out to the facsimile section 4 via the connector 1005.

Next, a case in which information is received from the facsimile section 4 will be explained. The image information from the facsimile section 4 is transmitted to the signal line 1064 via the connector 1005. The signal 1064 is input to the selector 1014 and the selector 1017. When the image received during facsimile reception is rotated and output to the printer unit 2 in accordance with an instruction from the CPU 1003, the signal 1064 input to the selector 1014 is rotated by the rotation circuit 1015. The signal 1062 output from the rotation circuit 1015 is input to the pattern matching circuit 1018 via the selector 1016 and the selector 1017.

When image received during facsimile reception is output to the printer unit 2 as it is in accordance with an instruction from the CPU 1003, the signal 1064 input to the selector 1017 from the facsimile section 4 is input to the pattern matching circuit 1018.

The pattern matching circuit 1018 has the function of smoothing the "jaggies" (jaggedness) of the edge of the image received during facsimile reception. The pattern matched signal is input to the LUT 1020 via the selector 1019. In order for the image received by facsimile to be output by the printer unit 2 at a desired density, the table of the LUT 1020 can be changed by the CPU 1003. The output signal 1068 of the LUT 1020 is input to the enlarging circuit 1022 via the selector 1021. The enlarging circuit 1022 performs an enlarging operation on 8-bit multi-valued signals having two values (00H and FFH) by a first-order linear interpolation.

The 8-bit multi-valued signals having a number of values from the enlarging circuit 1022 are sent out to the reader unit 1 via the buffer 1010 and the connector 1001. The reader unit 1 inputs these signals to the external interface switching circuit 119 via the connector 120. The external interface switching circuit 119 inputs the signals from the facsimile section 4 to the Y signal generation/color detection circuit 113. The signals output from the Y signal generation/color detection circuit 113, after being subjected to the above-described processing, are output to the printer unit 2 where the image is formed on output paper (transfer paper).

[Operation of the Core Section 10 on the Basis of Information of the File Section 5]

A case in which information is output to the file section 5 will now be explained. The CPU 1003 communicates with the CPU 122 of the reader unit 1 via the communication IC 1002 and issues an original document scan command. The scanner unit 104 scans this original document in accordance with this command, and the reader unit 1 outputs image information to the connector 120.

The reader unit 1 and the external device 3 are connected to each other through a cable. The information from the reader unit 1 is input to the connector 1001 of the core section 10, and the image information input to the connector 1001 is formed into a uni-directional signal 1058 through the buffer 1010. The multi-valued 8-bit signal 1058 is converted into a desired signal by using the LUT 1011. The signal 1059 output from the LUT 1011 is input to the connector 1006 via the selector 1013, 1014 and 1016.

That is, the 8-bit multi-valued digital image signal is transferred as it is to the connector 1005 without using the functions of the binarization circuit 1012 and the rotation circuit 1015. When binary signals are to be filed through communication with the file section 5 via the CPU bus 1054 of the CPU 1003, the functions of the binarization circuit 1012 and the rotation circuit 1015 are used. The binarization operation and the rotation operation are the same as those in the above-described facsimile.

Next, a case in which information is received from the file section 5 will be explained. The image information from the file section 5 is input as the signals 1064 to the selector 1014 or the selector 1017 via the connector 1006. When the image information has been stored as 8-bit multi-valued digital image signals, this information can be input to the selector 1017; when the image information has been stored as binary image signals, this can be input to the selector 1014 or 1017.

In the case of filing at binary values, the same operation as for the facsimile are performed. In the case of filing at multi-values, the signal 1065 output from the selector 1017 is input to the LUT 1020 via the selector 1019. The LUT 1020 creates a look-up table in accordance with an instruction from the CPU 1003 according to the desired print density. The signal 1068 output from the LUT 1020 is input to the enlarging circuit 1022 via the selector 1021. The 8-bit multi-valued signal 1070 enlarged at a desired scaling-up factor by the enlarging circuit 1022 is sent out to the reader unit 1 via the buffer 1010 and the connector 1001. The information of the file section 5 which has been sent out to the reader unit 1 is output to the printer unit 2 and formed into an image on output paper (transfer paper) in the same way as in the above-described facsimile.

[Operation of the Core Section 10 on the Basis of the Information of the Computer Interface Section 7]

The computer interface section 7 interfaces with the computer 11 connected to the external device 3, and has three types of interfaces: SCSI, RS232C and Centronics as a computer interface. Information from each interface is sent out to the CPU 1003 via the connector 1007 and the data bus 1054. The CPU 1003 performs various controls on the basis of the contents received.

[Operation of the Core Section 10 on the Basis of the Information for the Formatter Section 8]

The formatter section 8 has the function for developing command data for a document file or the like received from the computer interface section 7 into image data. When the CPU 1003 determines that the data transmitted from the computer interface section 7 via the data bus 1054 is data for the formatter section 8, the CPU 1003 sends the data to the formatter section 8 whereby the transferred data is formed into image information as a visible image, and this image is developed in the image memory section 9 via the connector 1009.

Next, the procedure for receiving information from the formatter section 8 and forming an image on output paper (transfer paper) will be explained. The image information from the formatter section 8 is transmitted as multi-valued signals having two values (00H and FFH) to the signal line 1064 via the connector 1008. The signal 1064 is input to the selectors 1014 and 1017 which are controlled in accordance with an instruction from the CPU 1003. Thereafter, the operation is performed in the same way as in the case of the above-described facsimile.

[Operation of the Core Section 10 on the Basis of the Information in the Image Memory Section 9]

A case in which information is output to the image memory section 9 will be explained. The CPU 1003 communicates with the CPU 122 of the reader unit 1 via the communication IC 1002 and the connector 1001 and issues an original document scan command. In the reader unit 1, the scanner unit 104 scans the original document in response to this command, and the image information is output to the connector 120. The reader unit 1 and the external device 3 are connected to each other through a cable. The image information from the reader unit 1 is input to the connector 1001 of the core section 10. The image information input to the connector 1001 is sent out to the LUT 1011 via the multi-valued 8-bit signal line 1057 and the buffer 1010. The signal 1059 output from the LUT 1011 causes multi-valued image information to be transferred to the image memory section 9 via the selectors 1013, 1014 and 1016 and the connector 1009.

The image information stored in the image memory section 9 is sent out to the CPU 1003 via the CPU bus 1054 of the connector 1009. The CPU 1003 transfers data received from the image memory section 9 to the computer interface section 7. The computer interface section 7 transfers data in conformity with a desired interface selected from among the above-described three types of interfaces (SCSI, RS232C and Centronics).

Next, a case in which information is received from the image memory section 9 will be explained. Initially, image information is sent out to the core section 10 from the computer 11 via the computer interface section 7. If the CPU 1003 of the core section 10 determines that the data received from the computer interface section 7 via the CPU bus 1054 is data for the image memory section 9, the data is transferred to the image memory section 9 via the connector 1009. Next, the image memory section 9 transmits the 8-bit multi-valued signals 1064 to the selectors 1014 and 1017 via the connector 1009. The signals output from the selector 1014 or 1017 are output to the printer unit 2, and an image is formed on the output paper (transfer paper) in the same way as in the above-described facsimile.

[Explanation of the Facsimile Section 4]

Figure 5:
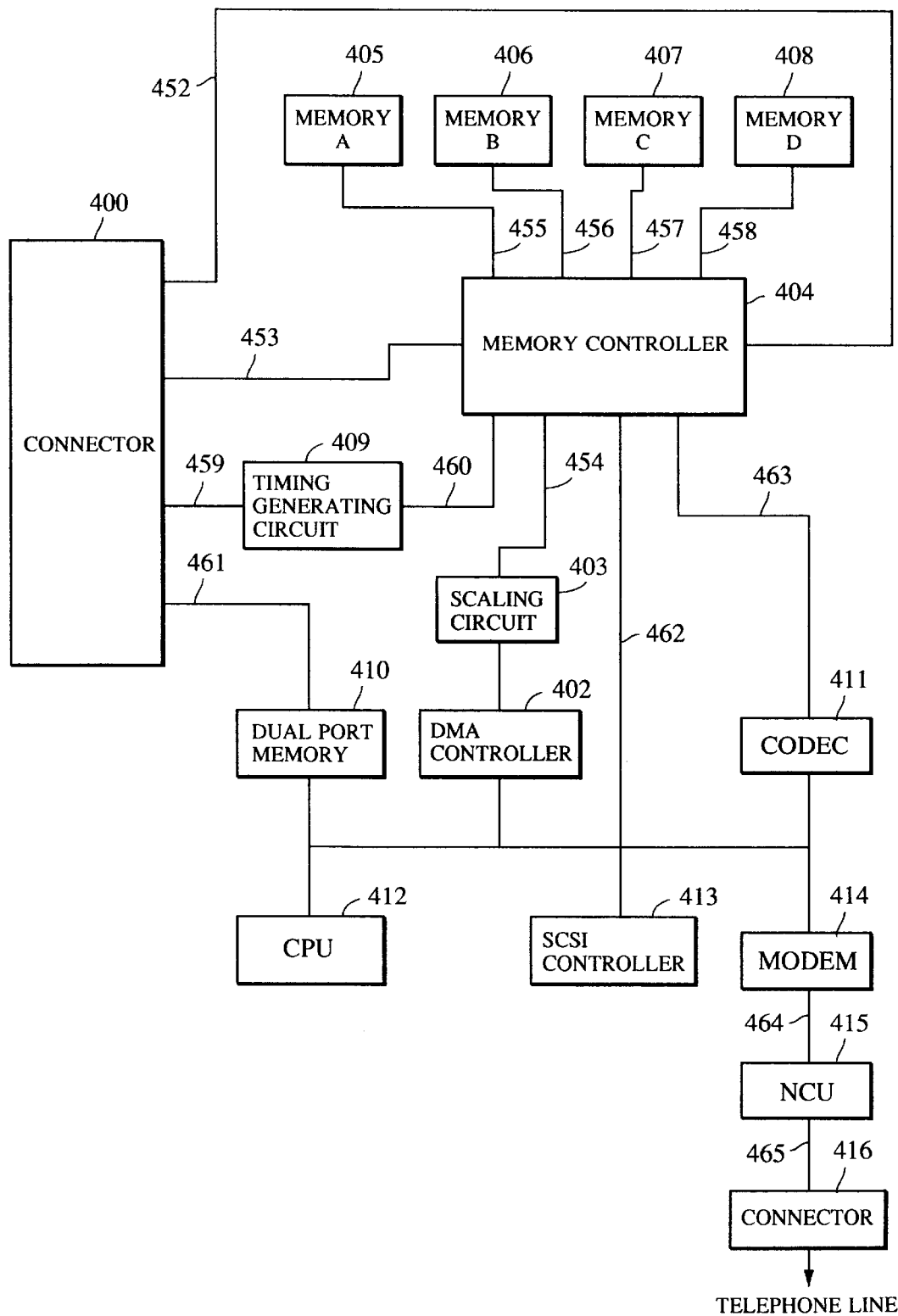
FIG. 5 is a block diagram of a facsimile section in accordance with the first embodiment of the present invention.

The facsimile section 4 will now be explained in detail with reference to FIG. 5.

The facsimile section 4 is connected to the buffer 1010 through a connector 400 and exchanges various signals.

When binary information from the core section 10 is stored in any of memories A405 to D408, a signal 453 from the connector 400 is input to a memory controller 404 and is stored in any of memories A405, B406, C407, and D408, or in a set of cascaded memories under the control of the memory controller 404.

The memory controller 404 has five functions: a mode in which data is exchanged between the memories A405, B406, C407, and D408 and a CPU bus 462 in accordance with an instruction from a CPU 412; a mode in which data is exchanged with a CODEC (coder and decoder) bus 463 of a CODEC 411 having coding and decoding functions; a mode in which data for the contents of the memories A405, B406, C407, and D408 is exchanged through a bus 454 from a scaling circuit 403 under the control of a DMA controller 402; a mode in which binary video input data 454 is stored in any of the memories A405, B406, C407, and D408 under the control of a timing generating circuit 409; and a mode in which the contents of the memories A405, B406, C407, and D408 are read out and output to a signal line 452.

The memories A405, B406, C407, and D408 each have a capacity of 2 Mbytes and store image information corresponding to A4 at a resolution of 400 dpi. The timing generating circuit 409, connected to the connector 400 through a signal line 459, is activated by a control signal (HSYNC, HEN, VSYNC, and VEN) from the core section 10 and generates a signal for achieving the two functions described below.

One function is that image signals from the core section 10 are stored in one or two memories from among memories A405, B406, C407, and D408. Another function is that image information is read from any one of memories A405, B406, C407, and D408 and is transmitted to the signal line 452. The CPU 1003 of the core section 10 is connected to a dual port memory 410 through a signal line 461, and the CPU 412 of the facsimile section 4 is connected to the dual port memory 410 through a signal line 462. The CPU 412 exchanges commands via the dual port memory 410. A SCSI controller 413 interfaces with a hard disk 12 connected to the facsimile section 4 shown in FIG. 1, in which hard disk data is stored during facsimile transmission or reception.

The CODEC 411 reads image information stored in any of the memories A405, B406, C407, and D408 and codes the image information by any desired method from among, for example, the MH, MR and MMR methods, and then stores it as coded information in any of the memories A405, B406, C407, and D408. Also, the CODEC 411 reads coded information stored in the memories A405, B406, C407, and D408 and encodes the information by a desired method of the MH, MR and MMR method, and then stores it as image information in any of the memories A405, B406, C407, and D408. A MODEM 414 modulates coded information from the hard disk connected to the CODEC 411 and the SCSI controller 413 so that it can be transmitted over a telephone line and demodulates information received from an NCU (network control unit) 415 in order to convert the information into coded information and transfers the coded information to the hard disk connected to the CODEC 411 and the SCSI controller 413. The NCU 415, directly connected to a telephone line, exchanges information with an exchange disposed in a telephone station in accordance with a predetermined procedure.

One embodiment in facsimile transmission will now be explained. The binary image signals from the reader unit 1 are input from the connector 400, pass through the signal line 453, and reach the memory controller 404. The signals 453 are stored in the memory A405 by the memory controller 404. The timing at which the image information is stored in the memory A405 is generated by the timing generating circuit 409 in response to the timing signal 459 from the reader unit 1. The CPU 412 connects the memories A405 and B406 of the memory controller 404 to a bus line 463 of the CODEC 411. The CODEC 411 reads image information from the memory A405, codes it by the MR method and writes the coded information in the memory B406.

When the CODEC 411 codes image information of an A4 size, the CPU 412 connects the memory B406 of the memory controller 404 to the CPU bus 462. The CPU 412 reads out the coded information in sequence from the memory B406 and transfers it to the MODEM 414 which modulates the coded information and transmits the facsimile information over the telephone line via the NCU 415.

Next, one embodiment in facsimile transmission will be explained. The information received over the telephone line is input to the NCU 415 whereby the information is connected to the telephone line in accordance with a predetermined procedure. The information from the NCU 415 enters the MODEM 414 whereby the information is demodulated. The CPU 412 stores the information from the MODEM 414 via the CPU bus 462 in the memory C407. When information for one screen has been stored in the memory C407, the CPU 412 controls the memory controller 404 so that a data line 457 of the memory C407 is connected to the bus line 463 of the CODEC 411. The CODEC 411 reads out the coded information of the memory C407 in sequence and decodes it, and stores it as image information in the memory D408. The CPU 412 communicates with the CPU 1003 of the core section 10 via the dual port memory 410, and makes the setting for making the image pass through the core section 10 from the memory D408 to the printer unit 2 whereby the image is printed.

When the setting for printout is terminated, the CPU 412 activates the timing generating circuit 409 in order to output a predetermined timing signal from a signal line 460 to the memory controller 404. The memory controller 404 reads out the image information from the memory D408 in synchronization with a signal from the timing generating circuit 409, transmits the image information to the signal line 452 and outputs it to the connector 400. The same operations as was explained in the core section 10 are performed from this point until the image information is output from the connector 400 to the printer unit 2.

[Explanation of the File Section 5]

Figure 6:
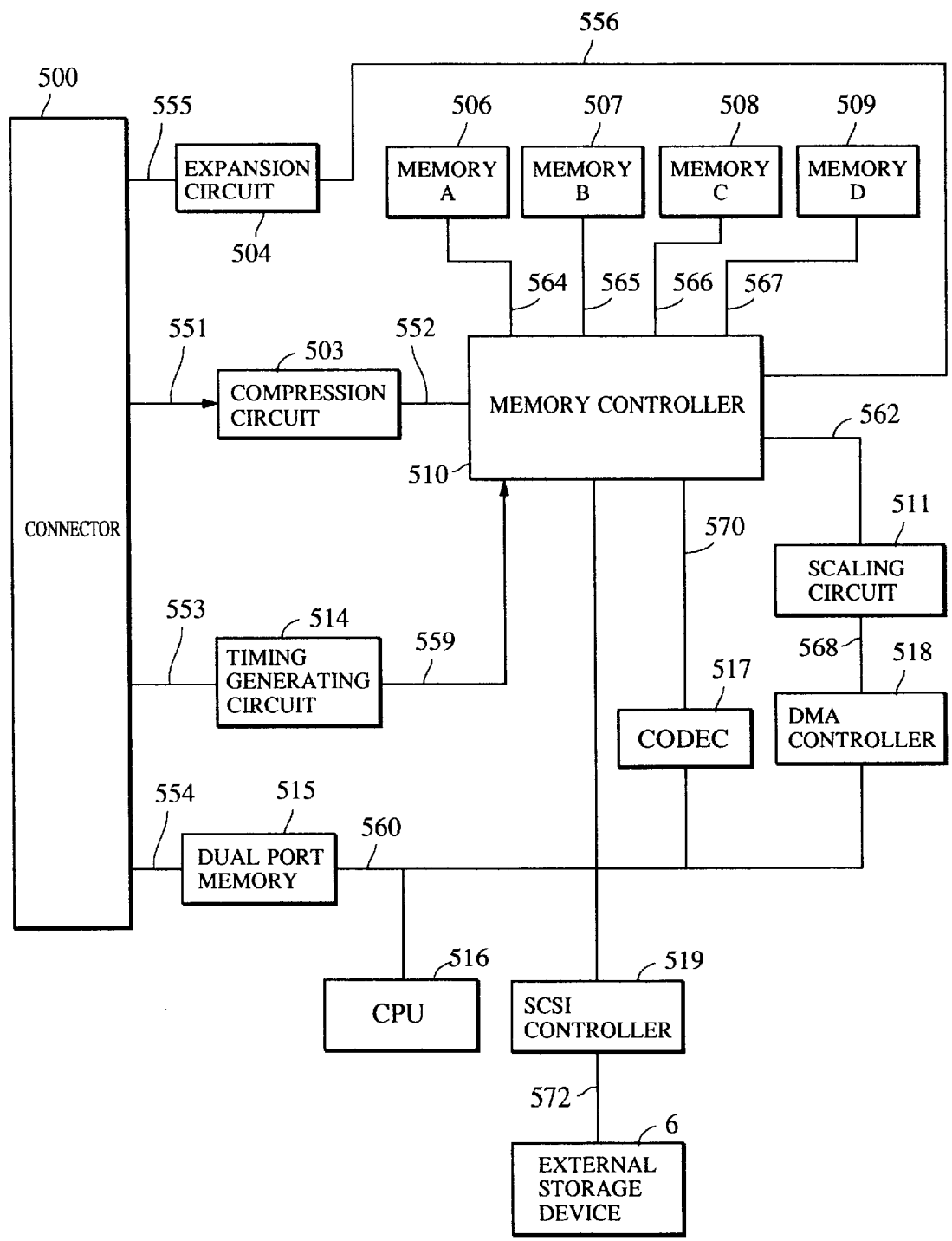
FIG. 6 is a block diagram of a file section in accordance with the first embodiment of the present invention.

The file section 5 will now be explained in detail with reference to FIG. 6.

The file section 5, connected to the core section 10 through a connector 500, exchanges various signals. A multi-valued input signal 551 is input to a compression circuit 503 where the multi-valued image information is compressed and the compressed information is output to a memory controller 510. Signals 552 output from a compression circuit 503 are stored in any of memories A506, B507, C508, and D509, or in two sets of cascaded memories under the control of the memory controller 510.

The memory controller 510 has five functions: a mode in which data is exchanged between the memories A506, B507, C508, and D509, and a CPU bus 560 in accordance with an instruction from a CPU 516; a mode in which data is exchanged with a CODEC bus 570 of a CODEC 517 for performing coding and decoding; a mode in which the contents of memories A506, B507, C508, and D509 are exchanged with a bus from a scaling circuit 511 under the control of a DMA controller 518; a mode in which a signal 563 is stored in any of memories A506, B507, C508, and D509 under the control of a timing generating circuit 514; and a mode in which the memory contents are read out from any of memories A506, B507, C508, and D509 and output to a signal line 558.

The memories A506, B507, C508, and D509 each have a capacity of 2 Mbytes and store image information corresponding to an A4 size page at a resolution of 400 dpi.

The timing generating circuit 514, connected to a connector 500 through a signal line 553, is activated by a control signal (HSYNC, HEN, VSYNC, and VEN) from the core section 10 and generates a signal for achieving the two functions described below.

One function is that image information from the core section 10 is stored in one or two from among memories A506, B507, C508, and D509. Another function is that image information is read from any one of memories A506, B507, C508, and D509 and transmitted to the signal line 556. The CPU 1003 of the core section 10 is connected to a dual port memory 515 through a signal line 554, and a CPU 516 of the file section 5 is connected to the dual port memory 515 through a signal line 560. The two CPUs exchange commands via the dual port memory 515. A SCSI controller 519 interfaces with the external storage device 6 connected to the file section 5 shown in FIG. 1. The external storage device 6, to be specific, is formed of an optomagnetic disk in which data, such as image information, is stored. The CODEC 517 reads out image information stored in any of the memories A506, B507, C508, and D509 and codes the image information by any desired method from among, e.g., the MH, MR and MMR methods, and then stores it as coded information, i.e., image information, in any of memories A405, B406, C407, and D408.

One embodiment in which image information is stored in the external storage device 6 will now be explained. 8-bit multi-valued image signals from the reader unit 1 are input through the connector 500, pass through a signal line 551 and input to the compression circuit 503. The signals 551 are input to the compression circuit 503 where the signals are compressed and converted into compressed information 552. The compressed information 552 is input to the memory controller 510. The memory controller 510 makes the timing generating circuit 559 generate a timing signal 559 in response to a signal 553 from the core section 10, and the compressed information 552 is stored in the memory A506 in accordance with this signal. The CPU 516 connects the memories A506 and B507 of the memory controller 510 to the bus line 570 of the CODEC 517. The CODEC 517 reads out compressed information from the memory A506 and codes it by the MR method and writes the coded information in the memory B507. When the coding by the CODEC 517 is terminated, the CPU 516 connects the memory B507 of the memory controller 510 to the CPU bus 560.

The CPU 516 reads out the coded information in sequence from the memory B507 and transfers the coded information to the SCSI controller 519 which causes the coded information 572 to be stored in the external storage device 6.

Next, one embodiment in which information is taken out from the external storage device 6 and output to the printer unit 2 will be explained. When the CPU 516 receives an information retrieval or print command, the CPU 516 receives coded information from the external storage device 6 via the SCSI controller 519 and transfers the coded information to the memory C508. At this time, the memory controller 510 connects the CPU bus 560 to a bus 566 of the memory C508 in accordance with an instruction from the CPU 516. When the transferring of the coded information to the memory C508 is terminated, the CPU 516 controls the memory controller 510 in order to connect the memories C508 and D509 to the bus 570 of the CODEC 517. The CODEC 517 reads the coded information from the memory C508 and decodes the coded information in sequence, and then transfers it to the memory D509. When scaling, such as enlargement or shrinking, is necessary when the information is output to the printer unit 2, the memory D509 is connected to a bus 562 of the scaling circuit 511, and the contents of the memory D509 are scaled under the control of the DMA controller 518. The CPU 516 communicates with the CPU 1003 of the core section 10 via the dual port memory 515 and makes the setting for making the image pass through the core section 10 from the memory D509 and output to the printer unit 2.

When the setting for printing out the image is terminated, the CPU 516 activates the timing generating circuit 514 in order to output a predetermined timing signal to the memory controller 510 from the memory D509. The memory controller 510 reads out decoded information from the memory D509 in synchronization with the signal from the timing generating circuit 514 and transmits the decoded information to the signal line 556 through which the decoded information is input to an expansion circuit 504 where the information is expanded. Signals 555 output from the expansion circuit 504 are output to the core section 10 via the connector 500. The operation from this point until the information is output to the printer 3 from the connector 500 is the same as the operation explained in the buffer 1010.

[Explanation of the Computer Interface Section 7]

Figure 7:
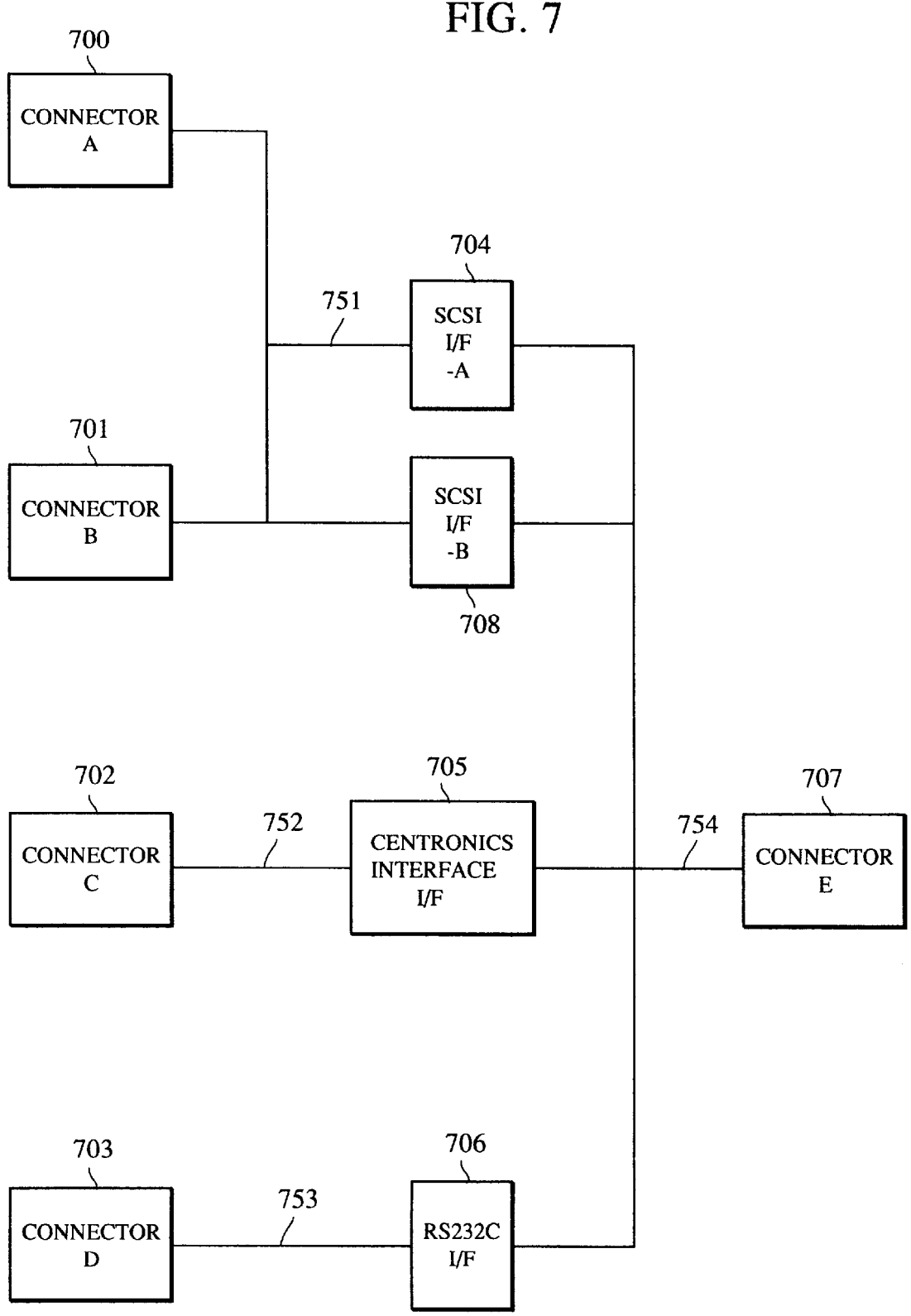
FIG. 7 is a block diagram of a computer interface section in accordance with the first embodiment of the present invention.

The computer interface section 7 will now be explained with reference to FIG. 7.

Connectors A700 and B701 are SCSI interface connectors. A connector C702 is a Centronics interface connector. A connector D703 is an RS232C interface connector. A connector E707 is a connector for connecting with the core section 10.

The SCSI interface connectors 704 and 708 each have two connectors A700 and B701. When a plurality of devices having an SCSI interface are to be connected, they are cascaded by using the connectors A700 and B701. When the external device 3 is connected to computer 11 in one-to-one correspondence, the connector A700 is connected to the computer 11 through a cable and a terminator is connected to the connector B701, or the connector B701 is connected to the computer 11 through a cable and a terminator is connected to the connector A700. Information input from the connector A700 or B701 is input to a SCSI interface A704 or B708. Af the SCSI interface A704 or B708 carries out the procedure of the SCSI protocol, the SCSI interface A704 or B708 outputs data to the connector E707 via a signal line 754.

The connector E707 is connected to the CPU bus 1054 of the core section 10, and the CPU 1003 of the core section 10 receives information input to the SCSI interface connector A704 or B708 from the CPU bus 1054. When data from the CPU 1003 of the core section 10 is output to the SCSI interface connector A704 or B708, the above-described procedure is reversed.

A Centronics interface 705 is connected to a connector C702 and input to the centronics interface 705 via a signal line 752. The Centronics interface 705 receives data in accordance with the procedure of a predetermined protocol and outputs the data to the connector E707 via the signal line 754. The connector E707 is connected to the CPU bus 1054 of the core section 10, and the CPU 1003 of the core section 10 receives information input to the Centronics interface connector C702 from the CPU bus 1054.

The RS232C interface is connected to the connector D703 and input to an RS232C interface 706 via the signal line 753. The RS232C interface 706 receives data in accordance with the procedure of a predetermined protocol and outputs the data to the connector E707 via the signal line 754. The connector E707 is connected to the CPU bus 1054 of the core section 10, and the CPU 1003 of the core section 10 receives information input to the RS232C interface connector D703 from the CPU bus 1054.

When data from the CPU 1003 of the core section 10 is output to the RS232C interface connector D703, the procedure of a predetermined protocol is reversed.

[Explanation of the Formatter Section 8]

Figure 8:
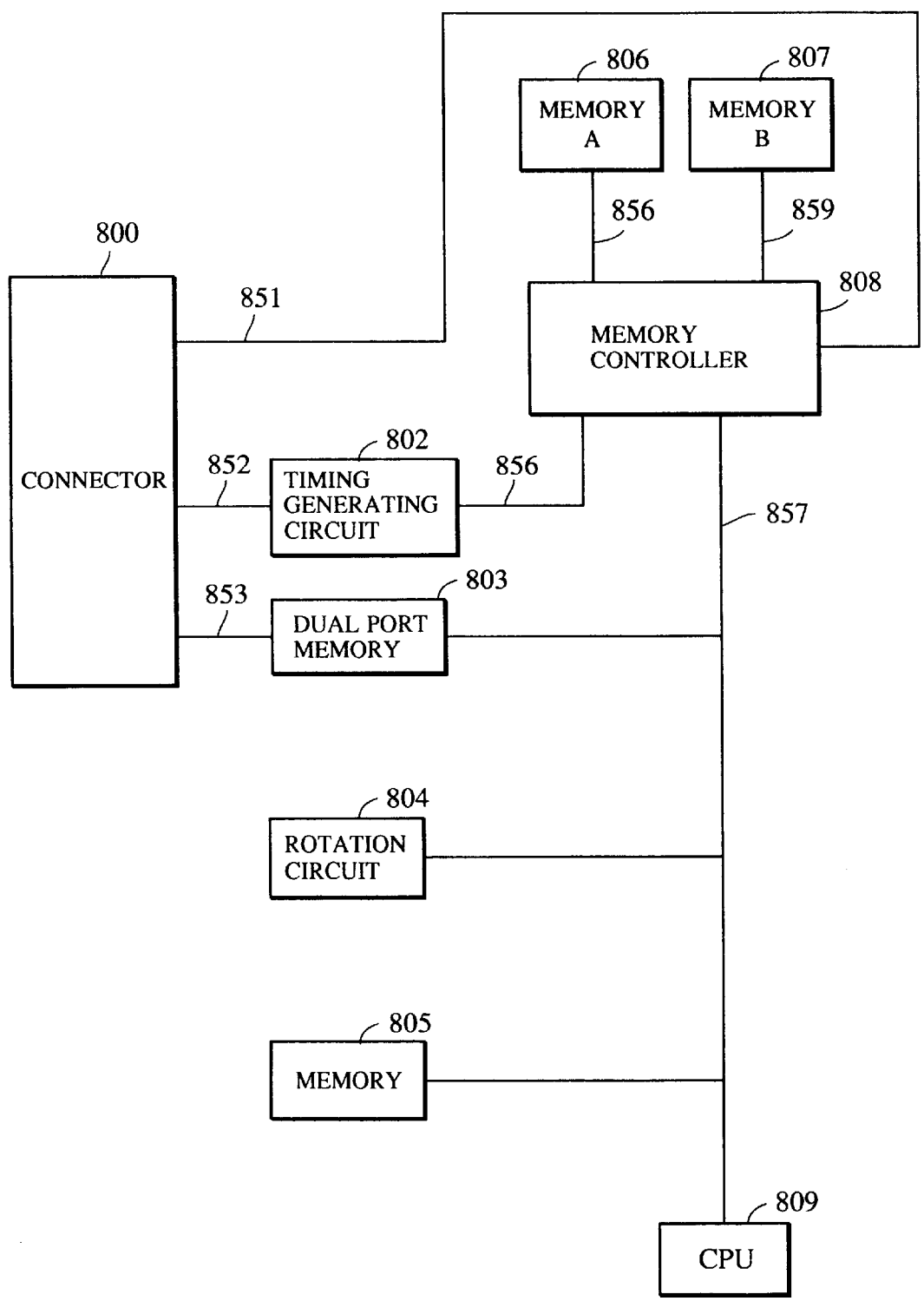
FIG. 8 is a block diagram of a formatter section in accordance with the first embodiment of the present invention.

The formatter section 8 will now be explained below with reference to FIG. 8.

The previously explained data from the computer interface section 7 is identified by the core section 10. When the data is data for the formatter section 8, the CPU 1003 of the core section 10 transfers data from the computer 11 to a dual port memory 803 via a connector 1008 of the core section 10 and a connector 800 of the image memory section 9. A CPU 809 of the formatter section 8 receives code data received from the computer 11 via the dual port memory 803.

The CPU 809 develops this code data in sequence into image data and transfers the image data to a memory A806 or B807 via a memory controller 808. The memories A806 and B807 each have a capacity of 1 Mbyte, and the contents of a sheet of paper of up to A4 size at a resolution of 300 dpi can be stored in one memory A806 or B807. When A3 paper is to be stored at a resolution of 300 dpi, the memories A806 and B807 are connected in a cascaded manner, and the image data is developed. The above memories are controlled by the memory controller 808 in accordance with an instruction from the CPU 809. When the character or picture must be rotated during the development of the image data, the character or picture is rotated by a rotation circuit 804, after which the image data is transferred to the A806 or B807.

When the development of the image data into the memory A806 or B807 is completed, the CPU 809 controls the memory controller 808 so that a data bus line 858 of the memory A806 or a data bus line 859 of the memory B807 is connected to an output line 855 of the memory controller 808.

Next, the CPU 809 communicates with the CPU 1003 of the core section 10 via the dual port memory 803 and sets a mode in which image information is output from the A806 or B807. The CPU 1003 of the core section 10 sets the CPU 122 at a print output mode by using a communications function contained in the CPU 122 of the reader unit 1 via the communication IC 1002 within the core section 10.

Next, the CPU 1003 of the core section 10 activates a timing generating circuit 802 via a connector 1008 and the connector 800 of the formatter section 8. The timing generating circuit 802 generates a timing signal for reading out image information from the memory A806 or B807 to the memory controller 808 in response to the signal from the core section 10. The image information from the memory A806 or B807 is input to the memory controller 808 via the signal line 858. The image information output from the memory controller 808 is transferred to the core section 10 via the signal line 851 and the connector 800. The output from the core section 10 to the printer unit 2 is performed in accordance with the operation explained in the core section 10.

[Explanation of the Image Memory Section 9]

Figure 9:
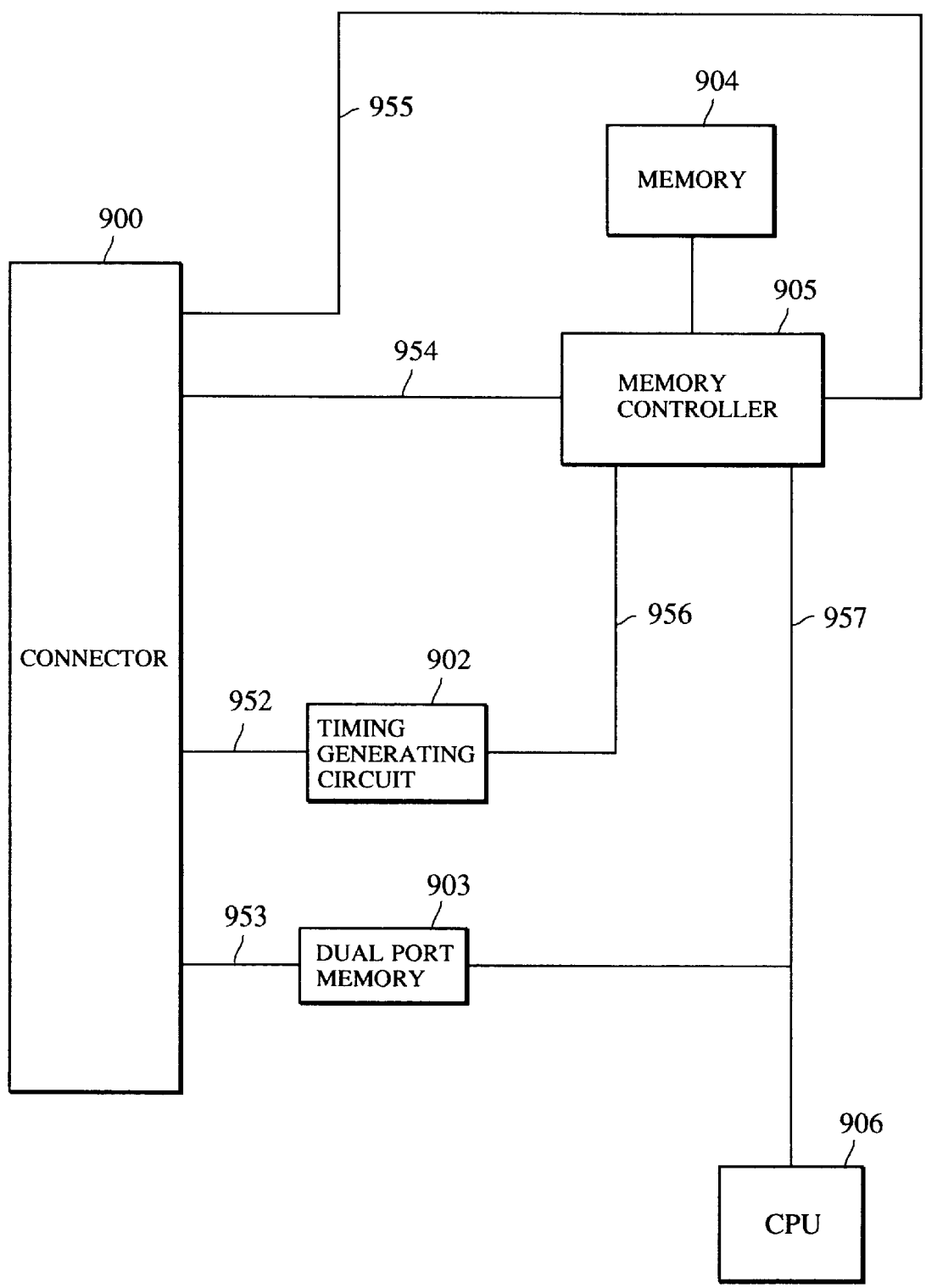
FIG. 9 is a block diagram of an image memory section in accordance with the first embodiment of the present invention.

The image memory section 9 will now be explained below with reference to FIG. 9.

The image memory section 9, connected to the core section 10 through a connector 900, exchanges various signals. Multi-valued input signals 954 are stored in a memory 904 under the control of a memory controller 905. The memory controller 905 has three functions of a mode in which data is exchanged between the memory 904 and a CPU bus 957 in accordance with an instruction from a CPU 906, a mode in which the input signal 954 is stored in the memory 904 under the control of a timing generating circuit 902, and a mode in which the memory contents are read from the memory 904 and output to a signal line 955.

The memory 904 has a capacity of 32 Mbytes and stores an image corresponding to a sheet of A3 size at a resolution of 400 dpi and at 256 gradations. The timing generating circuit 902, connected to the connector 900 through a signal line 952, is activated by a control signal (HSYNC, HEN, VSYNC, and VEN) from the core section 10 and generates a signal for achieving the two functions described below. One function is to store image information from the core section 10 in the memory 904, and another function is to read image information from the memory 904 and transmit the image information to the signal line 955.

A dual port memory 903 is connected to the CPU 1003 of the core section 10 via a signal line 953 and the CPU 906 of the image memory section 9 via the signal line 957. The two CPUs exchange commands with each other via the dual port memory 903.

One embodiment in which the image information is stored in the image memory section 9 and this information is transferred to the computer will be explained below. The 8-bit multi-valued image signals from the reader unit 1 are input from the connector 900 and input to the memory controller 905 via the signal line 954. The memory controller 905 makes the timing generating circuit 902 generate a timing signal 956 in response to a signal 952 from the core section 10, and the signal 954 is stored in the memory 904 in accordance with the signal 956.

The CPU 906 connects the memory 904 of the memory controller 905 to the CPU bus 957. The CPU 906 reads out image information in sequence from the memory 904 and transfers the image information to the dual port memory 903. The CPU 1003 of the core section 10 reads image information in the dual port memory 903 of the image memory section 9 via the signal line 953 and the connector 900, and transfers this information to the computer interface section 7.

Next, one embodiment in which the image information received from the computer 11 is output to the printer unit 2 will be explained below. The image information received from the computer 11 is sent out to the core section 10 via the computer interface section 7. The CPU 1003 of the core section 10 transfers the image information to the dual port memory 903 of the image memory section 9 via the CPU bus 1054 and the connector 1009.

At this time, the CPU 906 controls the memory controller 905 so that the CPU bus 957 is connected to the bus of the memory 904. The CPU 906 transfers image information from the dual port memory 903 via the memory controller 905 to the memory 904. When the image information has been completely transferred to the memory 904, the CPU 906 controls the memory controller 905 so that the data line of the memory 904 is connected to the signal line 955.

The CPU 906 communicates with the CPU 1003 of the core section 10 via the dual port memory 903 and makes the setting for making the image pass from the memory 904 through the core section 10 to the printer unit 2 whereby the image is printed.

When the setting for printing out the image is terminated, the CPU 906 activates the timing generating circuit 902 so that a predetermined timing signal is output from a signal line 956 to the memory controller 905. The memory controller 905 reads out the image information from the memory 904 in synchronization with the signal from the timing generating circuit 902, transmits the image information to the signal line 955 and outputs to the connector 900 from which the image information is output to the external device 3.

[Explanation of the Operation of this Embodiment]

In this embodiment having the above-described construction, referring to the accompanying drawings, an explanation will be given below of the operation for making a duplicate copy involved in an image processing job, such as facsimile transmission of image information by using the facsimile section 4 or outputting image to the printer unit 2.

Figure 10:
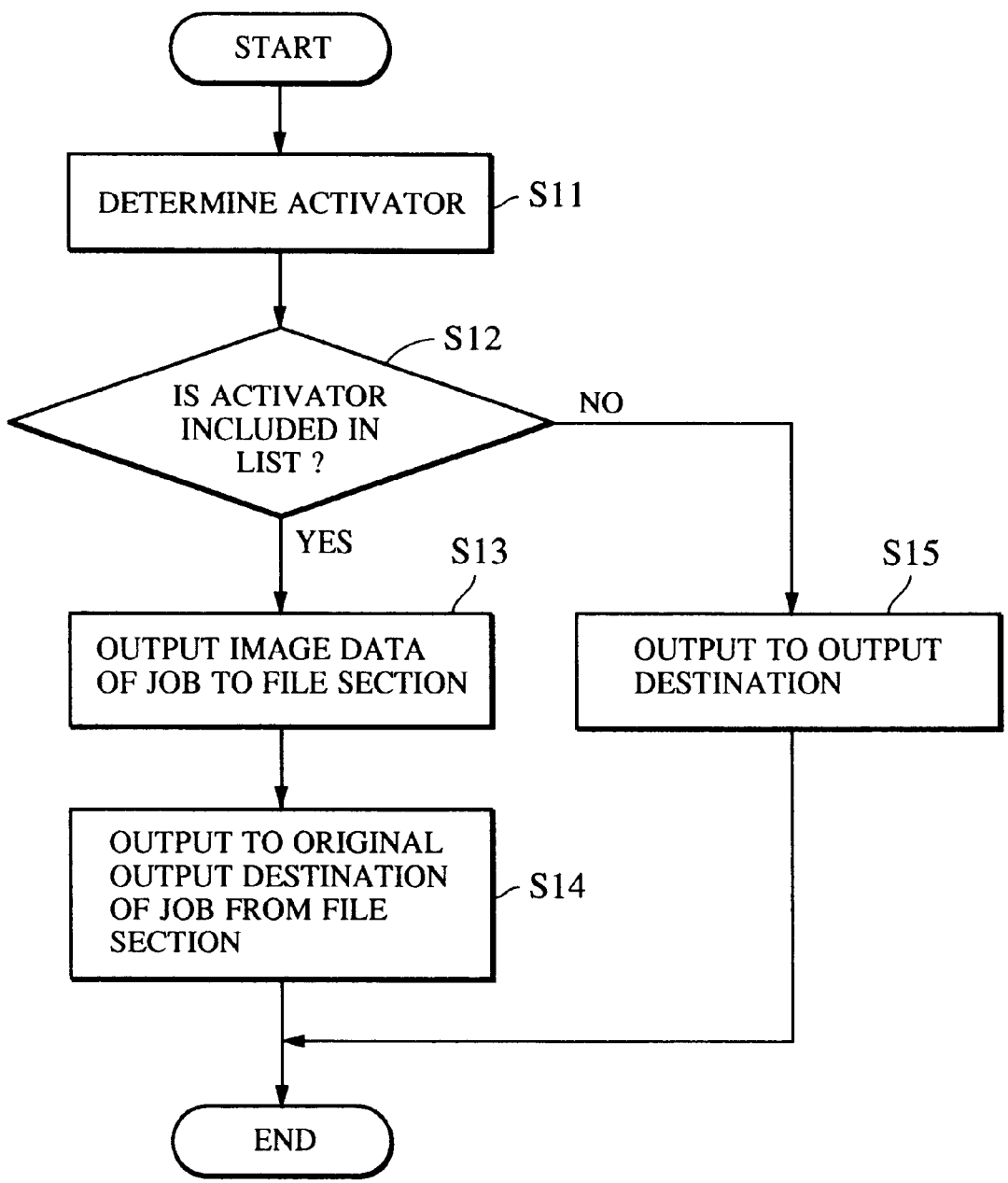
FIG. 10 is a flowchart illustrating an example of the procedure of an automatic duplicate copy acquisition operation in accordance with the first embodiment of the present invention.

FIG. 10 is a flowchart illustrating an example of the procedure of an automatic duplicate copy acquisition operation in accordance with the embodiment of the present invention.

The operator who initiates a job inputs his or her own user code from the operation section 124 of the reader unit 1. This user code is transmitted to the CPU 1003 of the core section 10, and the CPU 1003 identifies the initiator of the job (S11).

A list of user codes of users for which automatic duplicate copy acquisition is required has previously been written in a memory device inside the CPU 1003 by a manager. The CPU 1003 compares this list with the user code of the initiator identified at the step S11 (S12).

When the initiator is included in the list, the process proceeds to step S13 where the destination of the image data of the job is switched from the original destination, for example, the facsimile section 4, set by the activator to the file section 5, and the image processing job is executed. Then, the image data output to the file section 5 is transferred to the original destination, for example, the facsimile section 4 (S14). With these steps S13 and S14, the duplicate copy of the output image data of the job is held in the file section 5.

On the other hand, if it is determined in step S12 that the initiator is not included in the list and the image processing job does not require a duplicate copy, the process proceeds to step S15 where the image processing job is performed with the original destination, for example, the facsimile section 4, as an output destination. In this case, no duplicate copy is made.

In step S11, the job initiator is identified on the basis of the user code input from the operation section 124. When the user code is input, a well-known ID card in which the user code is recorded by magnetic, electronic, mechanical or other means may be used. When the job is invoked from the external computer 11, the user code is input from an input device, such as a keyboard attached to the computer 11. The user code is transmitted to the CPU 1003 of the core section 10 via the computer interface section 7 and used in the same way as described above.

Although in this embodiment the file section 5 is used as the output destination for which a duplicate copy is to be made, needless to say, a device having an image output function, other than a file section, for example, a printer unit, a facsimile unit, or a computer interface section, may be used, and a duplicate copy acquisition operation, for example, making a duplicate copy in the form of a printout, can be performed.

Although in this embodiment the following two steps are performed to leave an image for a duplicate copy: image data is first output to an output destination for which a duplicate copy is to be made and then the image data is transferred to the original output destination of the job, these steps may, needless to say, be performed simultaneously or performed in a reverse order.

Although in this embodiment only an initiator is taken into consideration as a condition to make a duplicate copy, needless to say, more precise control is possible by making a job condition determination by using a combination of logical OR or logical AND of other conditions which will be explained in other embodiments.

According to this embodiment, as described above, it becomes possible to make the result of an image processing job invoked by a predetermined specific operator be left as a duplicate copy in an image file or the like. Thus, the operator does not have to perform another operation for making a duplicate copy when an image processing job which always requires a duplicate copy is performed by the operator.

[Second Embodiment]

An explanation will be given below of an operation for acquiring a duplicate copy involved in an image processing job in a combined image processing apparatus in accordance with a second embodiment of the present invention. The construction of the combined image processing apparatus of this embodiment is the same as that of the first embodiment, and thus a detailed explanation of the construction and operation of the combined image processing apparatus of this embodiment is omitted.

Figure 11:
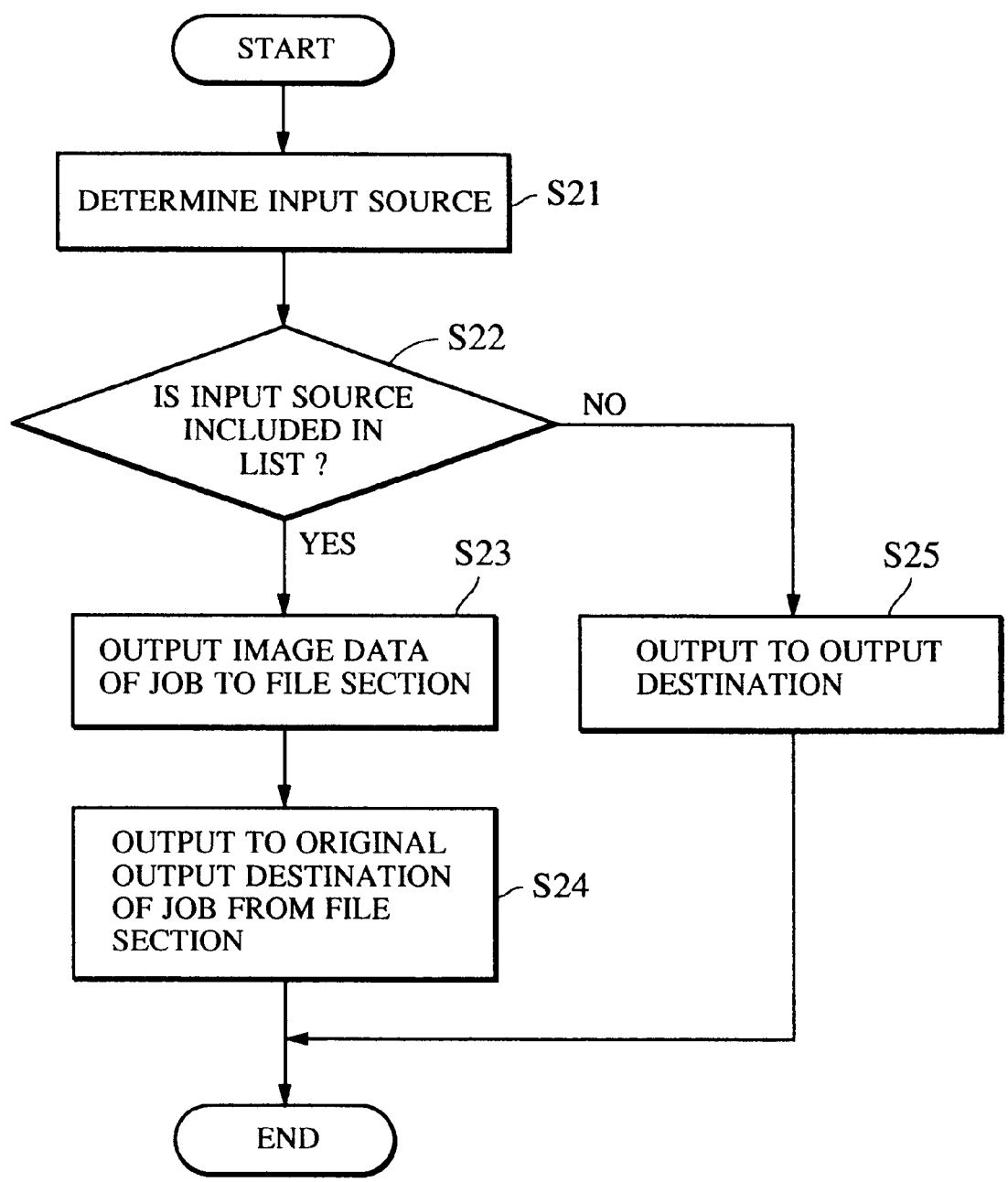
FIG. 11 is a flowchart illustrating an example of the procedure of an automatic duplicate copy acquisition operation in accordance with a second embodiment of the present invention.

FIG. 11 is a flowchart illustrating an example of the procedure of an automatic duplicate copy acquisition operation in accordance with a second embodiment of the present invention.

When a job is initiated by the operator, a combination of an input device, a conversion device, and an output device is determined by the CPU 1003 of the core section 10 according to the type of the image processing of the job, and the CPU 1003 determines an image data input source of the job on the basis of this combination (S21).

A list of image data input sources for which automatic duplicate copy acquisition is required has previously been written in a memory device inside the CPU 1003 by a manager. The CPU 1003 compares this list with the image data input source identified in step S21 (S22).

When an input source is the reader unit 1, for example, and included in the list, the process proceeds to step S23 where the destination of the image data of the job is switched from the original destination, for example, the printer unit 2, set by the activator to the file section 5, and the image processing job is performed. Next, the image data output to the file section 5 is transferred to the original destination, for example, the printer unit 2, again (S24). With these steps S23 and S24, the duplicate copy of the output image data of the job is held in the file section.

On the other hand, if it is determined in step S22 that the image processing job uses an input source which does not require a duplicate copy, the process proceeds to step S25, where the image processing job is performed with the original destination being as the output destination. In this case, no duplicate copy is left.

Information specified in step S21 as an input source for image data may be any of device type of a reader unit, a facsimile unit (reception), or a computer interface section (reception), a telephone number of a facsimile transmission source, an ID of a computer connected through a computer interface, and an ID of application software or a driver software used for sending out image data in the computer.

Although in this embodiment the file section 5 is used as the output destination for which a duplicate copy is to be made, needless to say, a device having an image output function, other than a file section, such as a printer unit, a facsimile unit, or a computer interface section, may be used.

Although in this embodiment the following two steps are performed to leave an image for a duplicate copy: image data is first output to an output destination for which a duplicate copy is made and then the image data is transferred to the original output destination of the job, needless to say, these steps may be performed simultaneously or performed in a reverse order.

Although in this embodiment only an input source is taken into consideration as a condition to make a duplicate copy, needless to say, more precise control is possible by making a job condition determination by using a combination of logical OR or logical AND of other conditions which will be explained in other embodiments.

According to this embodiment, as described above, it becomes possible to make the result of an image processing job, in which image data is given by a predetermined specific image data input source, be automatically held as a duplicate copy in an image file. Thus, when an image processing job is performed from an image data input source for which a duplicate copy needs to be made, the operator does not have to perform another operation for making a duplicate copy.

[Third Embodiment]

An explanation will be given below of an operation for acquiring a duplicate copy involved in an image processing job in a combined image processing apparatus in accordance with a third embodiment of the present invention. The construction of the combined image processing apparatus of this embodiment is the same as that of the first embodiment, and thus a detailed explanation of the construction and operation of the combined image processing apparatus of this embodiment is omitted.

Figure 12:
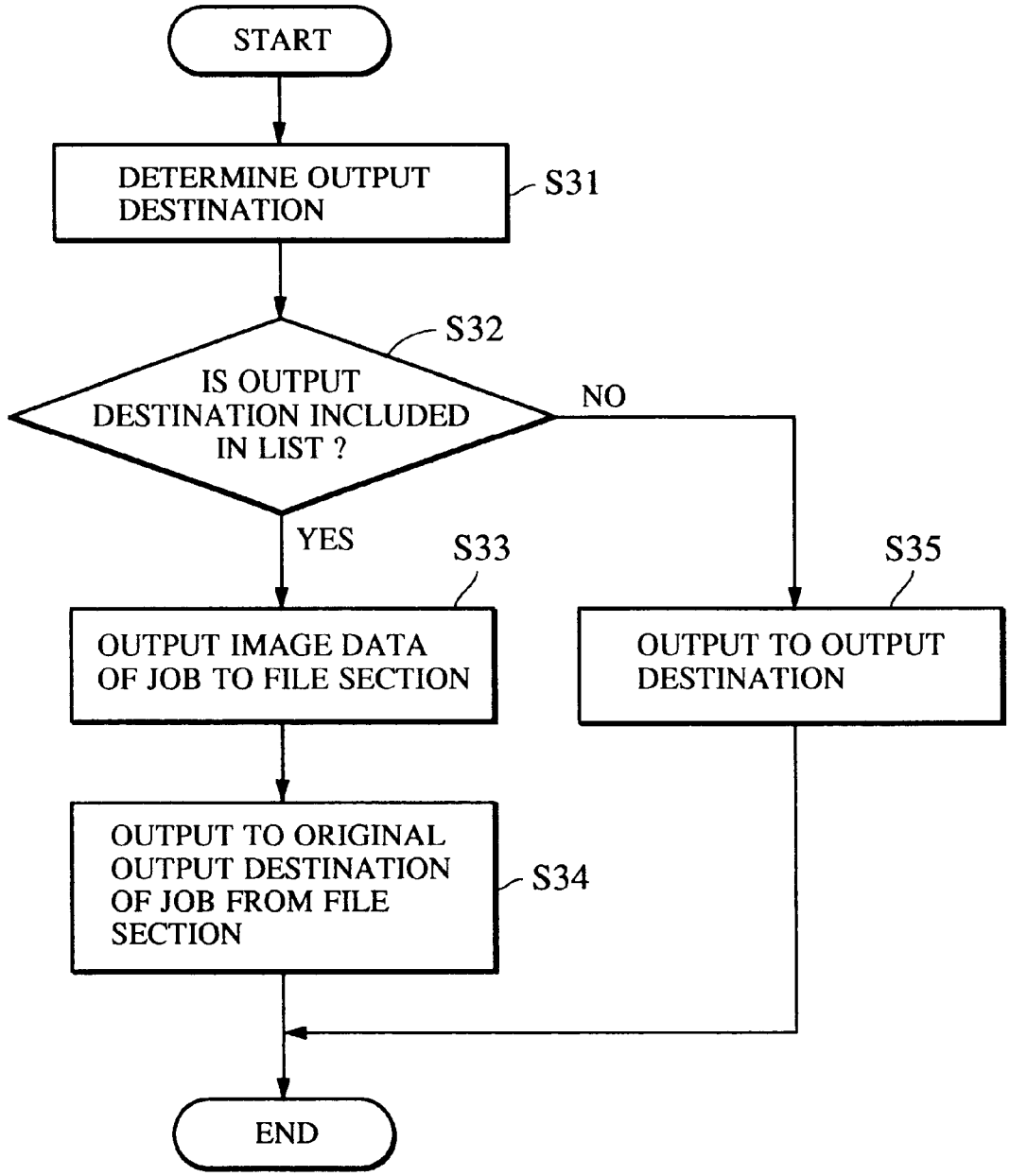
FIG. 12 is a flowchart illustrating an example of the procedure of an automatic duplicate copy acquisition operation in accordance with a third embodiment of the present invention.

FIG. 12 is a flowchart illustrating an example of the procedure of an automatic duplicate copy acquisition operation in accordance with the third embodiment of the present invention.

When a job is initiated by an operator, a combination of an input device, a conversion device, and an output device is determined by the CPU 1003 of the core section 10 according to the type of the image processing of the job, and the CPU 1003 determines an image data output destination of the job on the basis of this combination (S31).

A list of image data output destinations for which automatic document acquisition is required has previously been written in a memory device inside the CPU 1003 by a manager. The CPU 1003 compares this list with the image data output destination identified in step S31 (S32). When the output destination is, for example, the printer unit 2, and the printer unit 2 is included in the list, the process proceeds to step S33 where the destination of the image data of the job is switched from the original destination, for example, the printer unit 2, set by the activator to the file section 5, and the image processing job is performed. Next, the image data output to the file section 5 is transferred to the original destination, for example, the printer unit 2, again (S34). With these steps S33 and S34, the duplicate copy of the output image data of the job is made.

On the other hand, if it is determined in step 32 that the image processing job is a job using the image output destination which does not require a duplicate copy, the process proceeds to step S35 where the image processing job is performed with the original destination being as the output destination. In this case, no duplicate copy is made.

Information specified in step S31 as an output destination for image data may be any of device types of a printer unit, a facsimile unit (transmission), a computer interface section (transmission) and the like, a telephone number of a facsimile transmission destination, an ID of a computer connected through a computer interface, and an ID of application software or a driver software used for receiving image data in the computer.

Although in this embodiment the file section 5 is used as the output destination for which a duplicate copy is to be made, needless to say, a device having an image output function, other than a file section, such as a printer unit, a facsimile unit, or a computer interface section, may be used.

Although in this embodiment the following two steps are performed to leave an image for a duplicate copy: image data is first output to an output destination for which a duplicate copy is made and then the image data is transferred to the original output destination of the job, these steps may, needless to say, be performed simultaneously or performed in a reverse order.

Although in this embodiment only an output destination is taken into consideration as a condition to make a duplicate copy, needless to say, more precise control is possible by making a job condition determination by using a combination of logical OR or logical AND of other conditions which will be explained in other embodiments.

According to this embodiment, as described above, it becomes possible to make the result of an image processing job, in which image data is output to a predetermined specific image data output destination, be automatically held as a duplicate copy in an image file. Thus, when an image processing job is performed for an image data output destination for which a duplicate copy needs to be made, the operator does not have to perform another operation for making a duplicate copy.

[Fourth Embodiment]

An explanation will be given below of an operation for acquiring a duplicate copy involved in an image processing job in a combined image processing apparatus in accordance with a fourth embodiment of the present invention. The construction of the combined image processing apparatus of this embodiment is the same as that of the first embodiment, and thus a detailed explanation of the construction and operation of the combined image processing apparatus of this embodiment is omitted.

Figure 13:
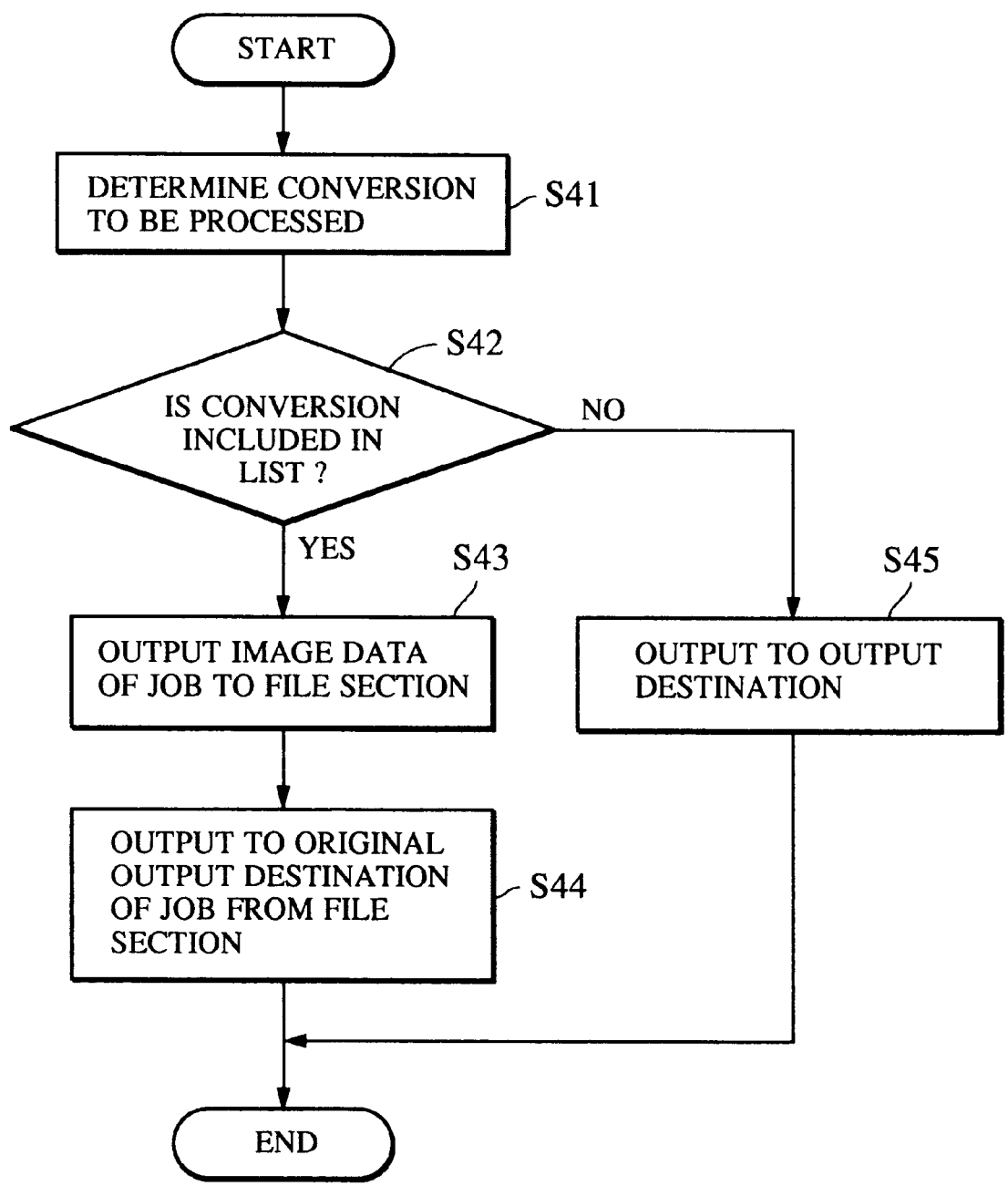
FIG. 13 is a flowchart illustrating an example of the procedure of an automatic duplicate copy acquisition operation in accordance with a fourth embodiment of the present invention.

FIG. 13 is a flowchart illustrating an example of the procedure of an automatic duplicate copy acquisition operation in accordance with the fourth embodiment of the present invention.

When a job is initiated by an operator, a combination of an input device, a conversion device, and an output device is determined by the CPU 1003 of the core section 10 according to the type of the image processing of the job, and the CPU 1003 determines a conversion to be applied to the image data of the job on the basis of this combination (S41).

A list of image data conversions for which automatic document acquisition is required has previously been written in a memory device inside the CPU 1003 by a manager. The CPU 1003 compares this list with the image data conversion identified in step S41 (S42). When a conversion to be applied is a rotation of the image, for example, and the rotation of the image is included in the list, the process proceeds to step S43 where the destination of the image data of the job is switched from the original destination set by the activator to the file section 5, and the image processing job is performed. Next, the image data output to the file section 5 is transferred to the original destination again (S44). With these steps S43 and S44, the duplicate copy of the output image data of the job is made.

On the other hand, it is determined in step S42 that the image data conversion performed in the image processing job does not require a duplicate copy, the process proceeds to step S45 where the image processing job is performed with the original destination being as the output destination. In this case, no duplicate copy is made.

Information specified as a conversion type of image data in step S41 includes the type of page description language for image rasterizing performed by the formatter section 8, the device types of the binarization circuit 1012, the enlarging circuit 1022 and the rotation circuit 1015, parameters to be set at the apparatus and the like.

Although in this embodiment the file section 5 is used as the output destination for which a duplicate copy is to be made, a device having an image output function, other than a file section, for example, a printer unit, a facsimile unit, or a computer interface section may be used.

Although in this embodiment the following two steps are performed to leave an image for a duplicate copy: image data is first output to an output destination for which a duplicate copy is made and then the image data is transferred to the original output destination of the job, these steps may, needless to say, be performed simultaneously or performed in a reverse order.

Although in this embodiment only the type of conversion of image data is taken into consideration as a condition to make a duplicate copy, needless to say, more precise control is possible by making a job condition determination by using a combination of logical OR or logical AND of other conditions which will be explained in other embodiments.

According to this embodiment, as described above, it becomes possible to make the result of an image processing job, in which the image data is converted by a predetermined specific image data conversion device, be held as a duplicate copy in an image file. Thus, when an image processing job for which a duplicate copy needs to be left, in which the image data is converted by a predetermined specific image data conversion device, is performed, the operator does not have to perform another operation for making a duplicate copy.

[Fifth Embodiment]

An explanation will be given below of an operation for acquiring a duplicate copy involved in an image processing job in a combined image processing apparatus in accordance with a fifth embodiment of the present invention. The construction of the combined image processing apparatus of this embodiment is the same as that of the first embodiment, and thus a detailed explanation of the construction and operation of the combined image processing apparatus of this embodiment is omitted.

Figure 14:
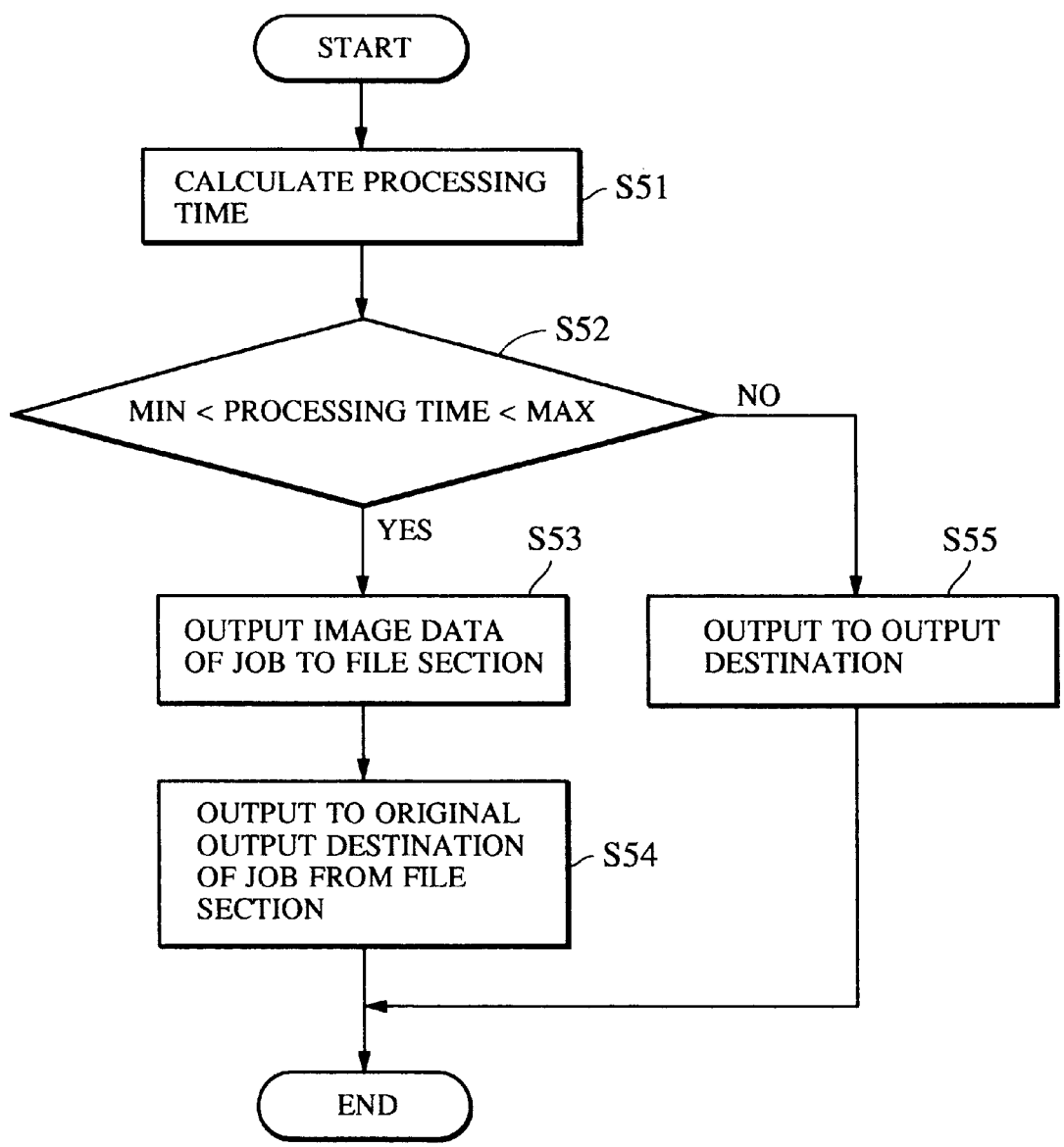
FIG. 14 is a flowchart illustrating an example of the procedure of an automatic duplicate copy acquisition operation in accordance with a fifth embodiment of the present invention.

FIG. 14 is a flowchart illustrating an example of the procedure of an automatic duplicate copy acquisition operation in accordance with the fifth embodiment of the present invention.

When a job is initiated by an operator, a combination of an input device, a conversion device, and an output device, and the amount of image data supplied from the input device are determined by the CPU 1003 of the core section 10 according to the type of the image processing of the job, and the CPU 1003 determines the processing time of the job on the basis of this combination and the amount of input data (S51).

A case will be used as an example, in which a job of rasterizing and printing data described by a page description language is invoked in a combination of the computer interface section 7, the formatter section 8 and the printer unit 2. The number of pages of a document to be output received from the computer 11 is received by the CPU 1003, and the CPU 1003 multiplies a standard time required for an operation for developing and printing one page by the number of pages of a document to be output in order to estimate the processing time.

The range of the processing time of the job (the lower and upper limit) for which automatic document acquisition is required has previously been written in a memory device inside the CPU 1003 by a manager. The CPU 1003 compares this range with the processing time calculated in step S51 (S52).

When the processing time calculated is included in the range, the process proceeds to step S53 where the destination of the image data of the job is switched from the original destination set by the activator to the file section 5, and the image processing job is executed. Next, the image data output to the file section 5 is transferred to the original destination (S54). With these steps S53 and S54, the duplicate copy of the output image data of the job is held in the file section.

On the other hand, if it is determined in step S52 that the processing time required for the image processing job does not require a duplicate copy, the process proceeds to step S55 where the image processing job is performed with the original destination being as an output destination. In this case, no duplicate copy is made.

Although in this embodiment the file section 5 is used as the output destination for which a duplicate copy is to be made, a device having an image output function, other than a file section, for example, a printer unit, a facsimile unit, or a computer interface section, may be used.

Although in this embodiment the following two steps are performed to leave an image for a duplicate copy: image data is first output to an output destination for which a duplicate copy is made and then the image data is transferred to the original output destination of the job, these steps may be performed simultaneously or performed in a reverse order.

Although in this embodiment only an image processing time is taken into consideration as a condition to make a duplicate copy, needless to say, more precise control is possible by making a job condition determination by using a combination of logical OR or logical AND of other conditions which will be explained in other embodiments.

According to this embodiment, as described above, it becomes possible to make the result of an image processing job requiring a predetermined processing time be held as a duplicate copy in an image file. Thus, when an image processing job which takes a long time, for example, is performed from an image data input source for which a duplicate copy needs to be made, the operator does not have to perform another operation for making a duplicate copy.

[Sixth Embodiment]

An explanation will be given below of an operation for acquiring a duplicate copy involved in an image processing job in a combined image processing apparatus in accordance with a sixth embodiment of the present invention. The construction of the combined image processing apparatus of this embodiment is the same as that of the first embodiment, and thus a detailed explanation of the construction and operation of the combined image processing apparatus of this embodiment is omitted.

Figure 15:
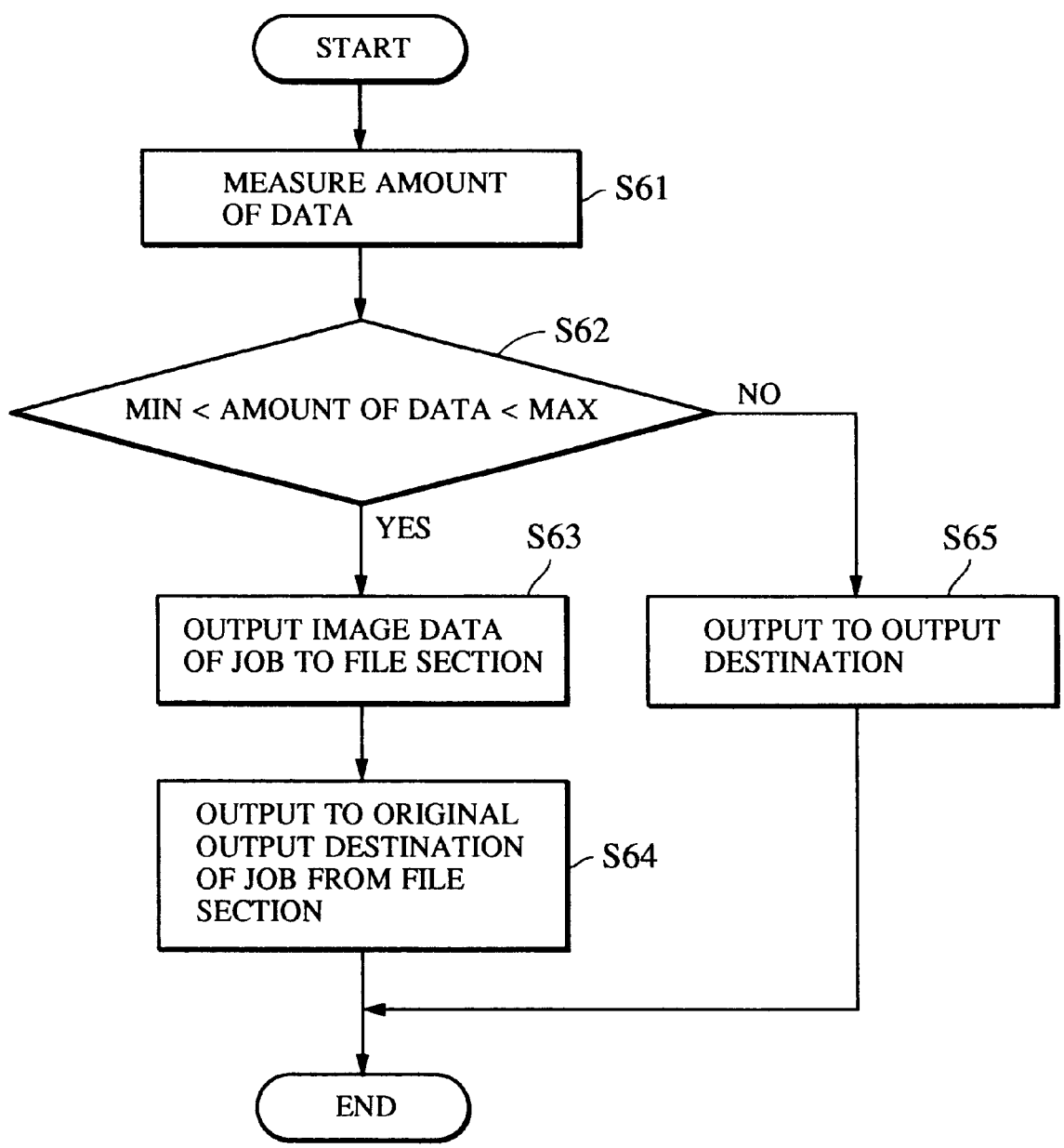
FIG. 15 is a flowchart illustrating an example of the procedure of an automatic duplicate copy acquisition operation in accordance with a sixth embodiment of the present invention.

FIG. 15 is a flowchart illustrating an example of the procedure of an automatic duplicate copy acquisition operation in accordance with the sixth embodiment of the present invention.

When a job is initiated by an operator, a combination of an input device, a conversion device, and an output device, and the amount of image data supplied from the input device are determined by the CPU 1003 of the core section 10 according to the type of the image processing of the job, and the CPU 1003 determines the amount of output data of the job on the basis of this combination and the amount of input data (S61).

A case will be used as an example, in which a job of rasterizing and printing data described by a page description language is invoked in a combination of the computer interface section 7, the formatter section 8 and the printer unit 2. The number of pages of a document to be output received from the computer 11 is received by the CPU 1003, and the CPU 1003 multiplies the amount of data after the development operation for one page by the number of pages of a document to be output in order to calculate the amount of output data.

The range of the amount of output data of the job (the lower and upper limit) for which automatic duplicate copy acquisition is required has previously been written in a memory device inside the CPU 1003 by a manager. The CPU 1003 compares this range with the amount of data calculated in step S61 (S62).

When the amount of data calculated is included in the range, the process proceeds to step S63 where the destination of the image data of the job is switched from the original destination set by the activator to the file section 5, and the image processing job is executed. Next, the image data output to the file section 5 is transferred to the original destination (S64). With these steps S63 and S64, the duplicate copy of the output image data of the job is held in the file section.

On the other hand, if it is determined in step S62 that the amount of data output in the image processing job does not require a duplicate copy, the process proceeds to step S65 where the image processing job is performed with the original destination being as an output destination. In this case, no duplicate copy is made.

Although in this embodiment the file section 5 is used as the output destination for which a duplicate copy is to be made, a device having an image output function, other than a file section, for example, a printer unit, a facsimile unit, or a computer interface section, may be used.

Although in this embodiment the following two steps are performed to leave an image for a duplicate copy: image data is first output to an output destination for which a duplicate copy is made and then the image data is transferred to the original output destination of the job, these steps may of course be performed simultaneously or performed in a reverse order.

Although in this embodiment only the amount of output image data is taken into consideration as a condition to make a duplicate copy, needless to say, more precise control is possible by making a job condition determination by using a combination of logical OR or logical AND of other conditions which will be explained in other embodiments.

According to this embodiment, as described above, it becomes possible to make the result of an image processing job, in which image data of a predetermined range is handled, be held as a duplicate copy in an image file. Thus, when an image processing job of a large amount of data, in which a large load is applied to the operation when the operation needs to be performed once more, is performed, or conversely, when an image processing job of such a small amount of data as not to oppress the storage capacity of a storage device of the image file is performed, the operator does not have to perform another operation for making a duplicate copy.

[Seventh Embodiment]

An explanation will be given below of an operation for acquiring a duplicate copy involved in an image processing job in a combined image processing apparatus in accordance with a seventh embodiment of the present invention. The construction of the combined image processing apparatus of this embodiment is the same as that of the first embodiment, and thus a detailed explanation of the construction and operation of the combined image processing apparatus of this embodiment is omitted.

Figure 16:
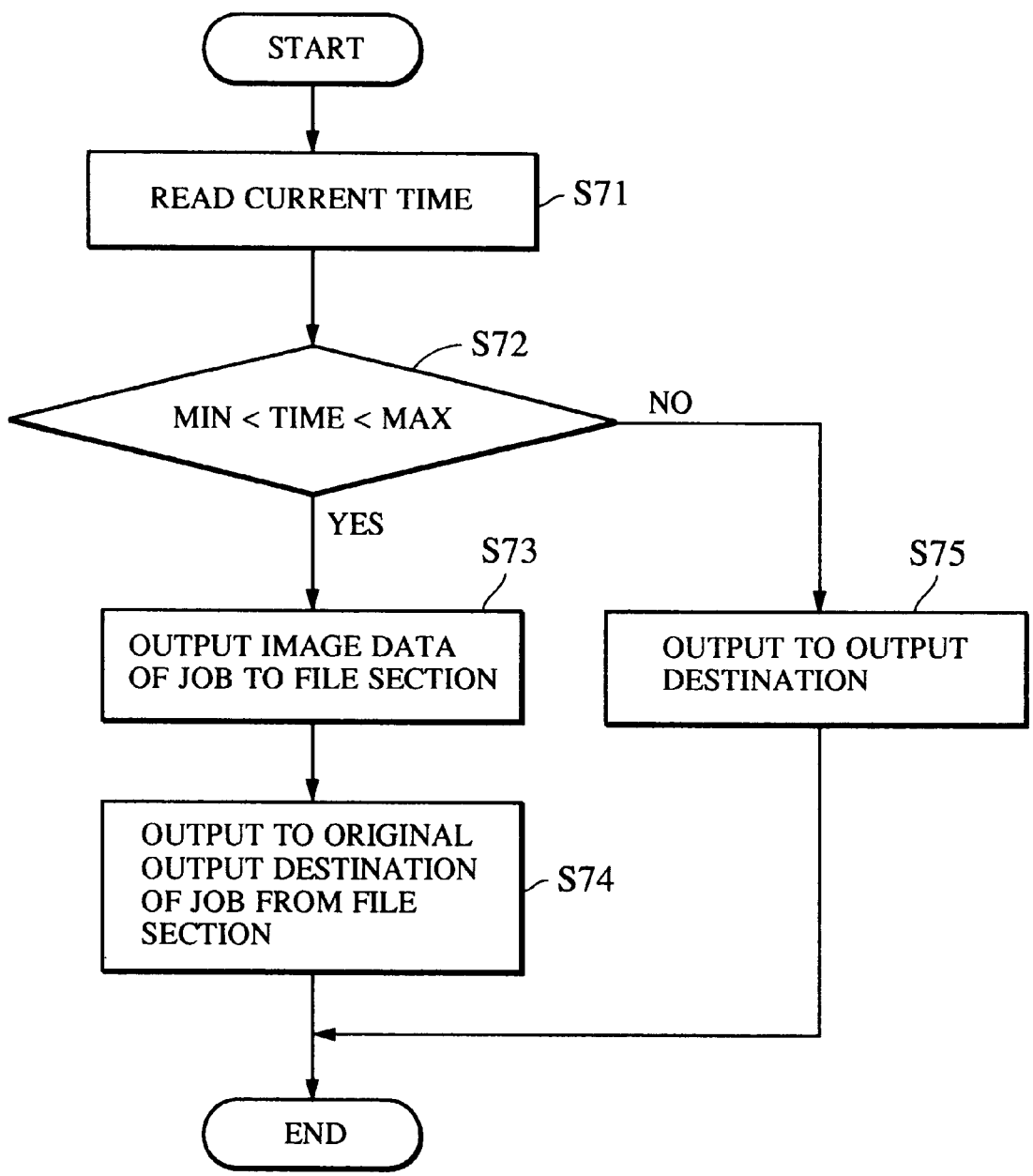
FIG. 16 is a flowchart illustrating an example of the procedure of an automatic duplicate copy acquisition operation in accordance with a seventh embodiment of the present invention.

FIG. 16 is a flowchart illustrating an example of the procedure of an automatic duplicate copy acquisition operation in accordance with the seventh embodiment of the present invention.

When a job is initiated by an operator, the time of this job initiation is read out from a calendar IC (not shown) contained in the CPU 1003 of the core section 10, and the CPU 1003 determines the job starting time (S71).

The range of the job starting time (the starting and termination time) for which automatic document acquisition is required has previously been written in a memory device inside the CPU 1003 by a manager. The CPU 1003 compares this range with the processing time calculated in step S71 (S72).

When the determined starting time is included in the range, the process proceeds to step S73 where the destination of the image data of the job is switched from the original destination set by the activator to the file section 5, and the image processing job is performed. Next, the image data output to the file section 5 is transferred to the original destination again (S74). With these steps S73 and S74, the duplicate copy of the output image data of the job is held in the file section.

On the other hand, when it is determined in step S72 that the starting time of the image processing job does not require a duplicate copy, the process proceeds to step S75 where the image processing job is performed with the original destination being as the output destination. In this case, no duplicate copy is made.

Although in this embodiment the file section 5 is used as the output destination for which a duplicate copy is to be made, a device having an image output function, other than a file section, for example, a printer unit, a facsimile unit, or a computer interface section, may be used.

Although in this embodiment the following two steps are performed to leave an image for a duplicate copy: image data is first output to an output destination for which a duplicate copy is made and then the image data is transferred to the original output destination of the job, these steps may, needless to say, be performed simultaneously or performed in a reverse order.

Although in this embodiment only a starting time of a job is taken into consideration as a condition to make a duplicate copy, needless to say, more precise control is possible by making a job condition determination by using a combination of logical OR or logical AND of other conditions which will be explained in other embodiments.

According to this embodiment, as described above, it becomes possible to make the result of an image processing job which is performed at a predetermined specific time be held as a duplicate copy in an image file or the like. Thus, when a specific image processing job requiring a duplicate copy is performed, such as a communication at a fixed time using a facsimile, the operator does not have to perform another operation for making a duplicate copy.

[Eighth Embodiment]

An explanation will be given below of an operation for acquiring a duplicate copy involved in an image processing job in a combined image processing apparatus in accordance with an eighth embodiment of the present invention. The construction of the combined image processing apparatus of this embodiment is the same as that of the first embodiment, and thus a detailed explanation of the construction and operation of the combined image processing apparatus of this embodiment is omitted.

Figure 17:
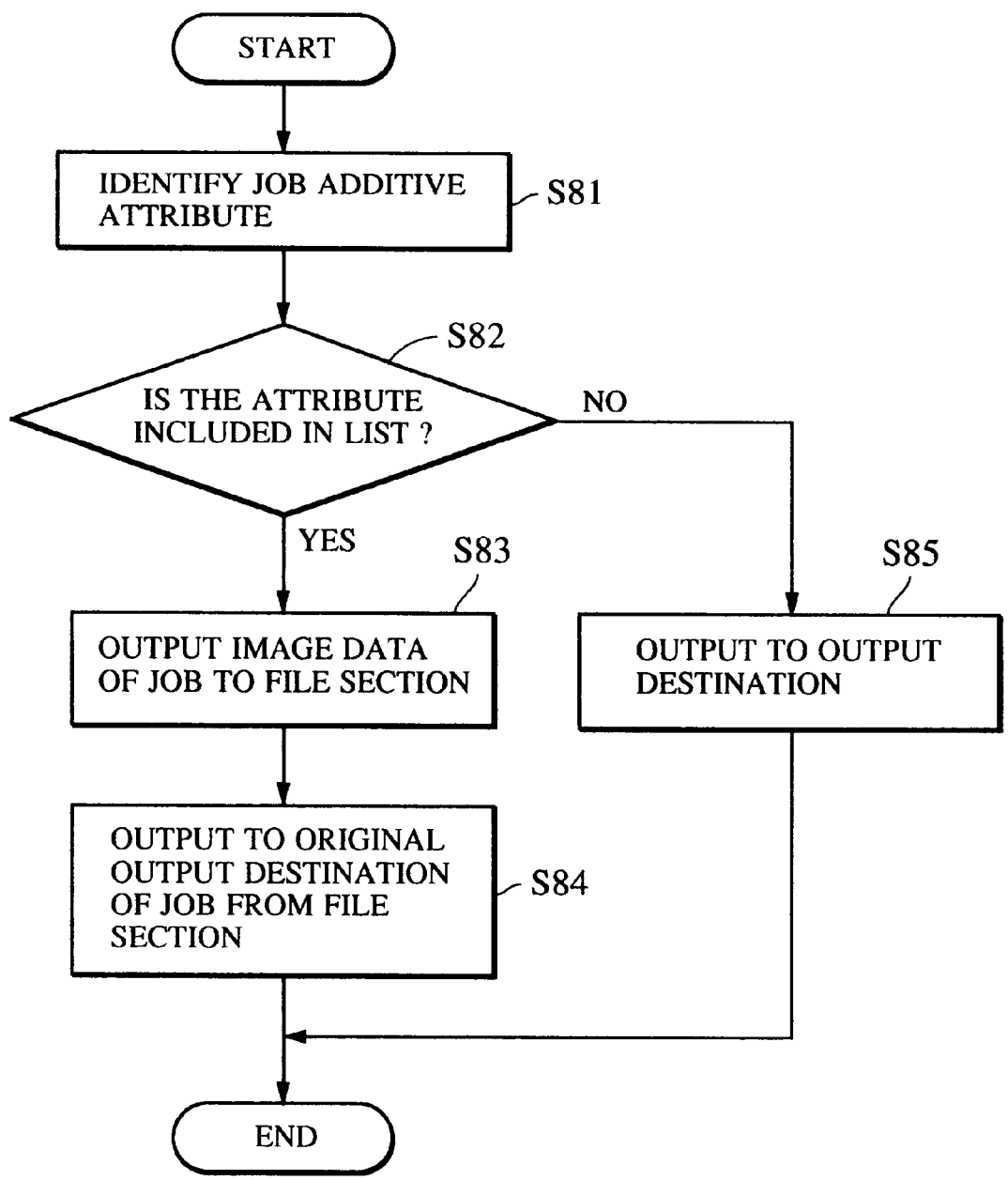
FIG. 17 is a flowchart illustrating an example of the procedure of an automatic duplicate copy acquisition operation in accordance with an eighth embodiment of the present invention.

FIG. 17 is a flowchart illustrating an example of the procedure of an automatic duplicate copy acquisition operation in accordance with the eighth embodiment of the present invention.

An operator who initiates a job adds job attributes, for example, "urgent", "important" or "normal", from the operation section 124. This job attribute is transmitted to the CPU 1003 of the core section 10, and the CPU 1003 identifies the job attribute (S81). A list of job attributes for which automatic document acquisition is required has previously been written in a memory device inside the CPU 1003 by a manager. The CPU 1003 compares this list with the job attribute identified in step S81 (S82).

When the job attribute is included in the list, the process proceeds to step S83 where the destination of the image data of the job is switched from the original destination set by the activator to the file section 5, and the image processing job is performed. Next, the image data output to the file section 5 is transferred to the original destination again (S84). With these steps S83 and S84, the duplicate copy of the output image data of the job is held in the file section 5.

On the other hand, it is determined in step S82 that the attribute of the image processing job does not require a duplicate copy, the process proceeds to step S85 where the image processing job is performed with the original destination being as the output destination. In this case, no duplicate copy is made.

Although, in step S81, the job attribute is identified by the operator on the basis of the job attribute information input from the operation section 124, specialized keys for representing attribute information, such as "urgent", "important" or "normal", disposed on the operation section 124 may be used for the determination.

Figure 18:
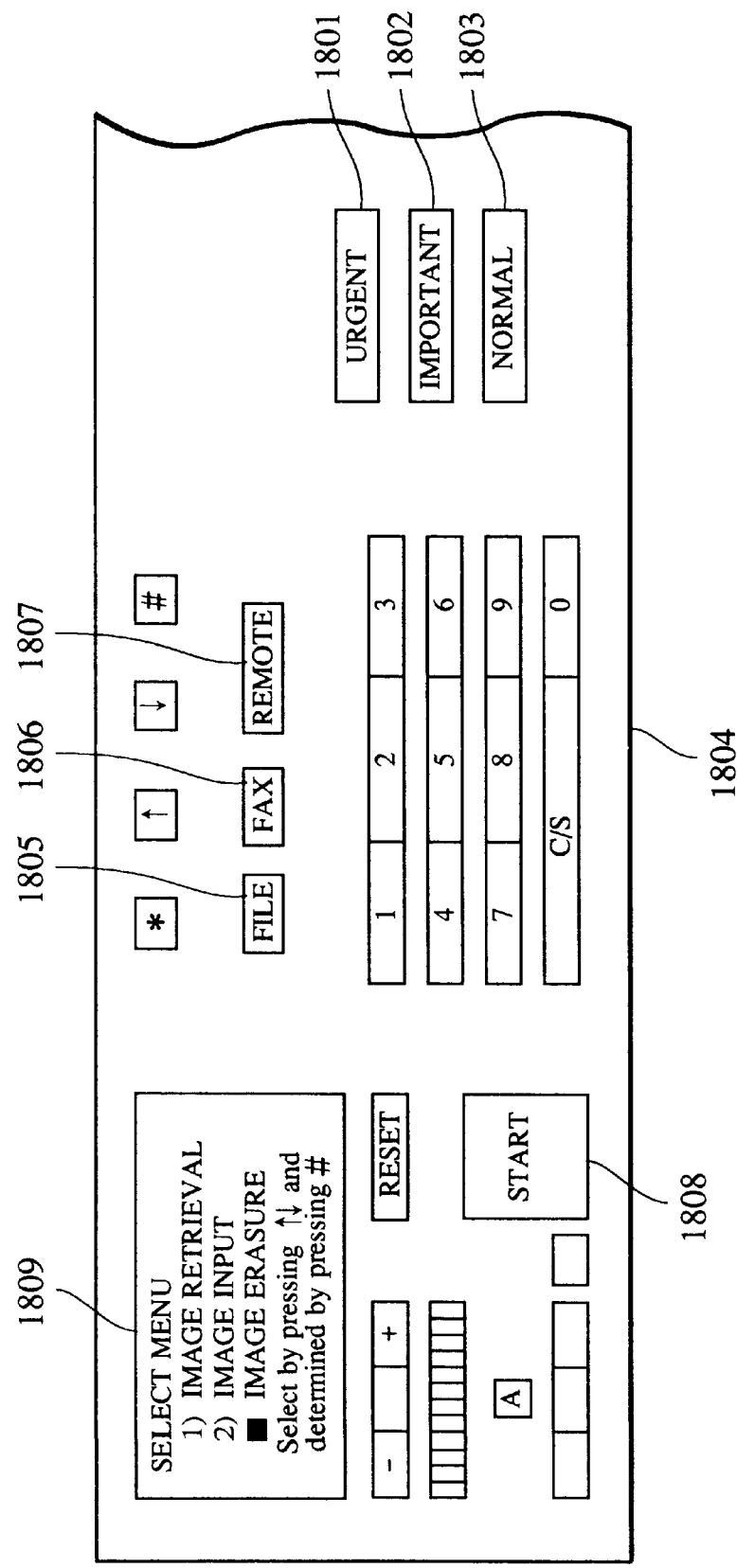
FIG. 18 is a schematic view illustrating an example of the operation section in accordance with the eighth embodiment of the present invention.

FIG. 18 shows an example of the operation section 124 on which are provided a ten-key pad 1804, output destination (a file, facsimile or the like) designation keys 1805 to 1807, a start key 1808, and a display device 1809, as well as specialized keys 1801 to 1803 for inputting attributes of an image processing job.

Figure 19:
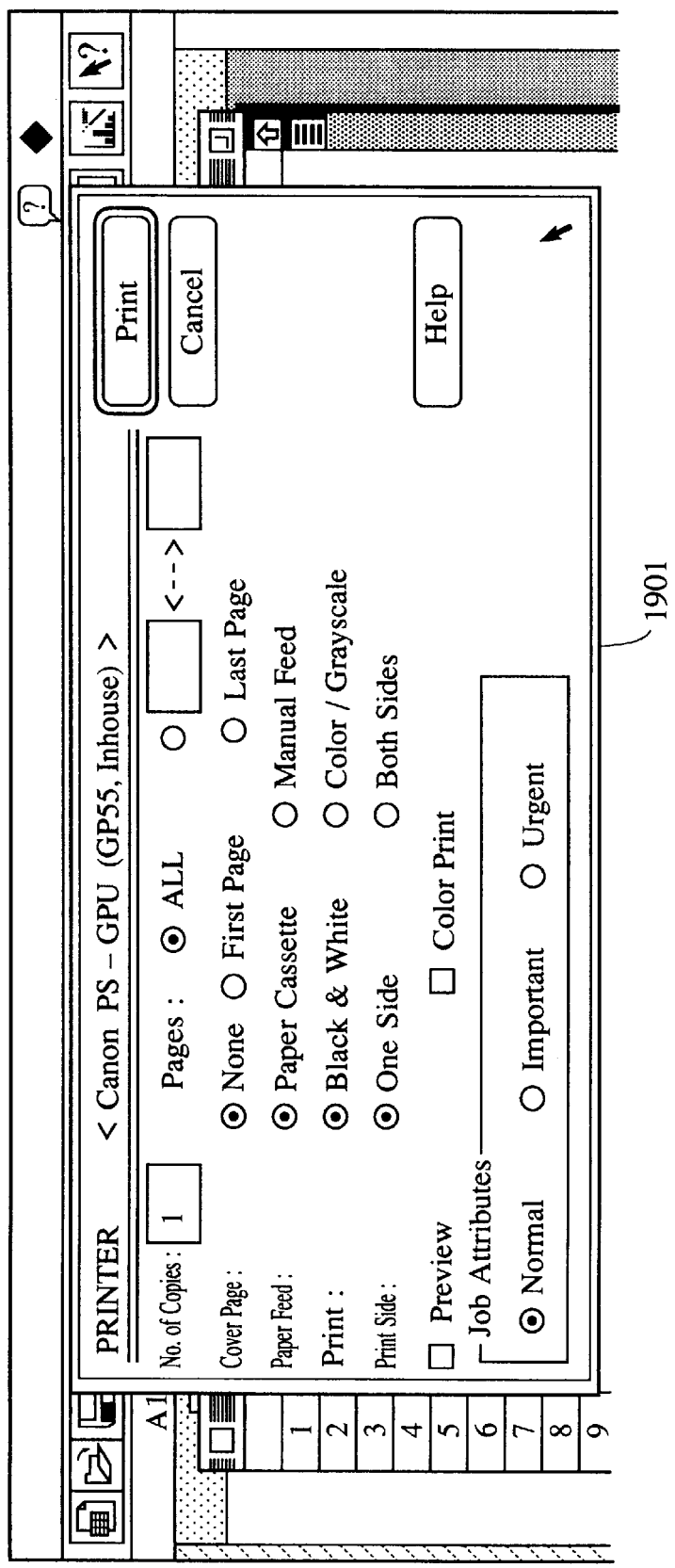
FIG. 19 is a schematic view illustrating an example of the display contents of the computer in accordance with the eighth embodiment of the present invention.

When a job is initiated from the external computer 11, job attributes are input from an input device, such as a keyboard or pointing device attached to the computer 11. Codes indicating the job attributes are transmitted to the CPU 1003 of the core section 10 via the computer interface section 7. An example of the input screen displayed on the display unit attached to the computer 11, for prompting inputting of job attributes, is shown in FIG. 19. FIG. 19 shows a state in which parameters for specifying a normal print mode, as well as a display 1901 for specifying job attributes, such as "urgent", "important" or "normal", is displayed on the display device of the computer 11. When this job attribute display is pointed to with a pointing device or the like, the above-described job attribute is input and transferred to the core section 10.

Although in this embodiment the file section 5 is used as the output destination for which a duplicate copy is to be made, a device having an image output function, other than a file section, for example, a printer unit, a facsimile unit, or a computer interface section, may be used.

Although in this embodiment the following two steps are performed to leave an image for a duplicate copy: image data is first output to an output destination for which a duplicate copy is made and then the image data is transferred to the original output destination of the job, needless to say, these steps may be performed simultaneously or performed in a reverse order.

Although in this embodiment only a job attribute is taken into consideration as a condition to make a duplicate copy, needless to say, more precise control is possible by making a job condition determination by using a combination of logical OR or logical AND of other conditions which are explained in other embodiments.

According to this embodiment, as described above, it becomes possible to make the result of an image processing job in which a specific attribute is given by an operator at start time be held as a duplicate copy in an image file or the like. Thus, when an image processing job requiring a duplicate copy, such as a job attached with an attribute of "important", is performed by the operator, the operator does not have to perform another operation for making a duplicate copy.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. An image processing method, comprising:

a setting step of setting an image processing job to be performed on image data;

an obtaining step of obtaining an attribute of the image processing job set in said setting step, the attribute representing that the image processing job is one of an important job and a normal job;

a processing step of processing image data in accordance with the image processing job set in said setting step to obtain processed image data;

a determining step of determining if the attribute of the image processing job obtained in said obtaining step represents an important job;

an outputting step of outputting the processed image data to an output destination in accordance with the image processing job set in said setting step; and a duplicating step of outputting the processed image data to a predetermined destination so as to make a duplicate copy when it is determined that the attribute of the image processing job represents an important job in said determining step.

2. An image processing method according to claim 1, wherein the processed image data is output to an image data storage medium in said duplicating step.

3. An image processing method according to claim 1, wherein the predetermined destination is not related to the image processing job.

4. An image processing method according to claim 1, further comprising an inputting step of inputting the attribute of the image processing job.

5. An image processing apparatus, comprising:

setting means for setting an image processing job to be performed on image data;

obtaining means for obtaining an attribute of the image processing job set by said setting means, the attribute representing that the image processing job is one of an important job and a normal job;

processing means for processing image data in accordance with the image processing job set by said setting means to obtain processed image data;

determining means for determining if the attribute of the image processing job obtained by said obtaining means represents an important job;

output means for outputting the processed image data to an output destination in accordance with the image processing job set by said setting means; and duplicating means for outputting the processed image data to a predetermined destination so as to make a duplicate copy, when it is determined by said determining means that the attribute of the image processing job represents an important job.

6. An image processing apparatus according to claim 5, wherein said duplicating means outputs the processed image data to an image data storage medium.

7. An image processing apparatus according to claim 5, wherein the predetermined destination is not related to the image processing job.

8. An image processing apparatus according to claim 5, further comprising inputting means for inputting the attribute of the image processing job.

9. An image processing system, comprising:

input means for inputting image data;

setting means for setting an image processing job to be performed on image data;

obtaining means for obtaining an attribute of the image processing job set by said setting means, the attribute representing that the image processing job is one of an important job and a normal job;

processing means for processing the image data input by said input means in accordance with the image processing job set by said setting means to obtain processed image data;

output means for outputting the processed image data to an output destination in accordance with the image processing job set by said setting means; and holding means for holding the processed image data so as to make a duplicate copy when the attribute of the image processing job obtained by said obtaining means represents an important job.

10. An image processing system according to claim 9, further comprising instructing means for instructing the attribute of the image processing job.

11. An image processing system according to claim 9, wherein said input means comprises image reading means for reading an image of an original document and for forming image data.

12. An image processing system according to claim 9, wherein said output means comprises image transmitting means for sending out image data to a remote place.

* * * * *

UNITED STATES PATENT AND TRADEMARK OFFICE
CERTIFICATE OF CORRECTION

PATENT NO. : 6,061,150
DATED : May 9, 2000
INVENTOR(S) : MASAHITO YAMAMOTO

Page 1 of 3

It is certified that error appears in the above-identified patent and that said Letters Patent is hereby corrected as shown below:

SHEET 1

Figure 1, In Box 4, "FACSCIMILE" should read
     --FACSIMILE--.

SHEET 3

Figure 3, In Box 124, "OPIRATION SECTION" should read
     --OPERATION SECTION--.

SHEET 4

Figure 4:
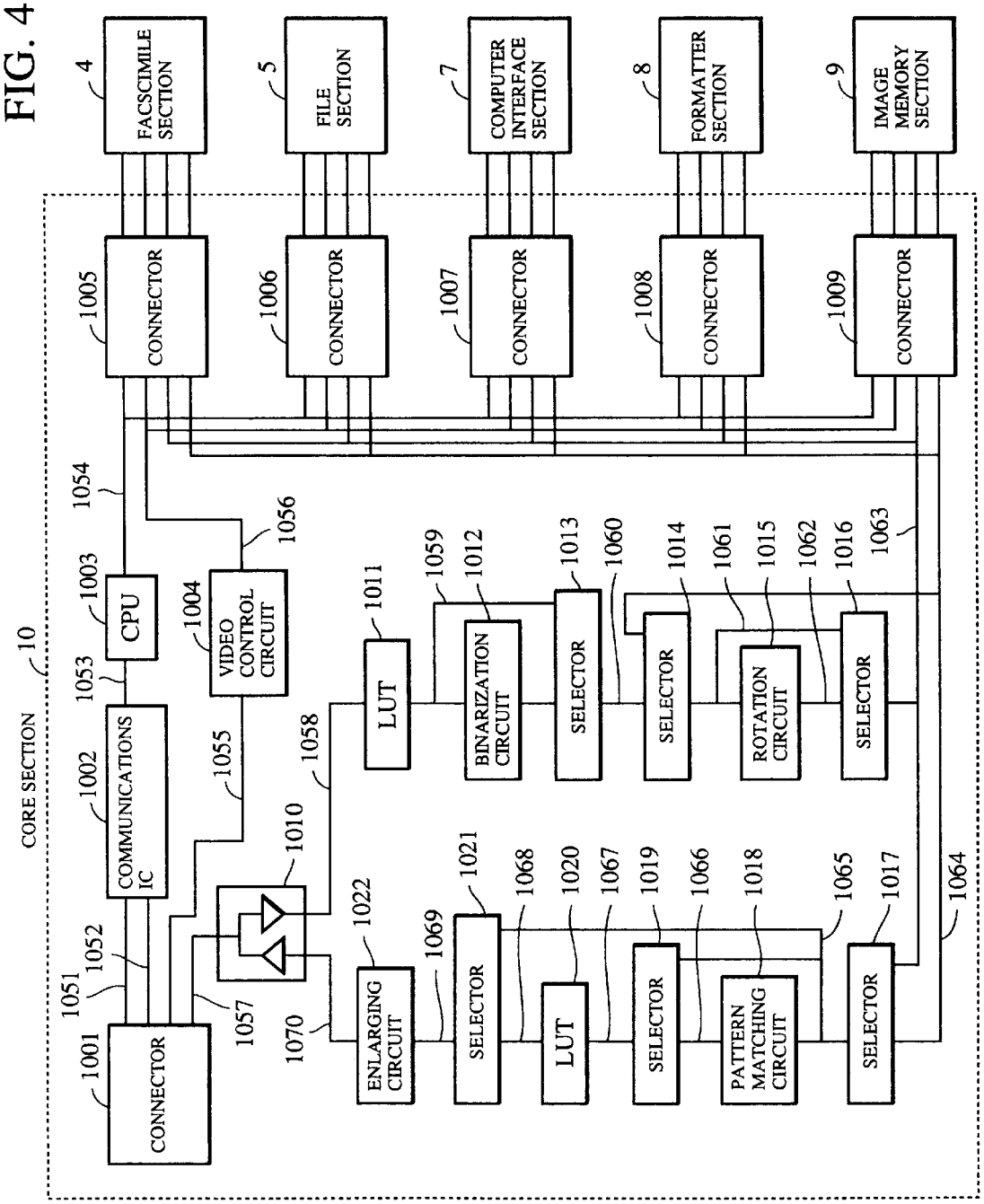
FIG. 4 is a block diagram of a core section in accordance with the first embodiment of the present invention.

Figure 4, In Box 4, "FACSCIMILE" should read
     --FACSIMILE--.

COLUMN 8

Line 21, "skipped." should read --skipped.)--.
   Line 26, "FFh," should read --FFH,--.

COLUMN 9

Line 45, "are" should read --is--.

UNITED STATES PATENT AND TRADEMARK OFFICE
CERTIFICATE OF CORRECTION

PATENT NO. : 6,061,150

DATED : May 9, 2000

INVENTOR(S) : MASAHITO YAMAMOTO

Page 2 of 3

It is certified that error appears in the above-identified patent and that said Letters Patent is hereby corrected as shown below:

COLUMN 12

Line 44, "was" should read --were--.

COLUMN 13

Line 38, "and" should read --and are--.

COLUMN 14

Line 50, "Af" should read --If--.

COLUMN 15

Line 39, "the" (second occurrence) should read
     --the memory--.
   Line 48, "the" should read --the memory--.

COLUMN 23

Line 24, "limit)" should read --limits)--.

UNITED STATES PATENT AND TRADEMARK OFFICE
CERTIFICATE OF CORRECTION

PATENT NO. : 6,061,150

DATED : May 9, 2000

INVENTOR(S) : MASAHITO YAMAMOTO

It is certified that error appears in the above-identified patent and that said Letters Patent is hereby corrected as shown below:

COLUMN 25

Line 39, "as" should be deleted.
Line 63, "is" should read --are--.

Signed and Sealed this

Third Day of April, 2001

Attest:

NICHOLAS P. GODICI

Attesting Officer     Acting Director of the United States Patent and Trademark Office